US012192696B2

(12) United States Patent
Rothman et al.

(10) Patent No.: US 12,192,696 B2
(45) Date of Patent: Jan. 7, 2025

(54) MICROPHONE WITH INTERCHANGEABLE GRILLES FOR ACOUSTICALLY FILTERING INCOMING AUDIO SIGNALS

(71) Applicant: Samuel Joseph Rothman, Monterey Park, CA (US)

(72) Inventors: Samuel Joseph Rothman, Monterey Park, CA (US); Charlene Amelia Gibbs, Monterey Park, CA (US)

(73) Assignee: Samuel J. Rothman, Monterey Park, CA (US)

(*) Notice: Subject to any disclaimer, the term of this patent is extended or adjusted under 35 U.S.C. 154(b) by 196 days.

(21) Appl. No.: 17/899,490

(22) Filed: Aug. 30, 2022

(65) Prior Publication Data

US 2023/0075789 A1 Mar. 9, 2023

Related U.S. Application Data

(60) Provisional application No. 63/239,378, filed on Aug. 31, 2021.

(51) Int. Cl.
*H04R 1/22* (2006.01)
*H04R 1/04* (2006.01)
*H04R 1/08* (2006.01)

(52) U.S. Cl.
CPC ............... *H04R 1/222* (2013.01); *H04R 1/04* (2013.01); *H04R 1/086* (2013.01)

(58) Field of Classification Search
CPC .......... H04R 1/086; H04R 1/04; H04R 1/222; H04R 1/08; H04R 19/016; H04R 1/02; H04R 2410/07
USPC .......... 381/355, 359, 366, 362, 122, 91, 337
See application file for complete search history.

(56) References Cited

U.S. PATENT DOCUMENTS

| | | | | |
|---|---|---|---|---|
| 11,463,812 | B1 * | 10/2022 | Yang | H04R 3/02 |
| 2005/0281429 | A1 * | 12/2005 | Rivera | H04R 1/023<br>381/189 |
| 2013/0032020 | A1 * | 2/2013 | Applegate | G10G 5/00<br>29/428 |
| 2016/0261950 | A1 * | 9/2016 | Akino | H04R 1/04 |
| 2020/0204894 | A1 * | 6/2020 | Harmke | H04B 1/3888 |

FOREIGN PATENT DOCUMENTS

| | | | |
|---|---|---|---|
| AT | 254962 | B | 6/1967 |
| DE | 202006017786 | * | 3/2007 |
| DE | 202006017786 | U1 | 3/2007 |

OTHER PUBLICATIONS

Rothman, Samuel J., International Search Report and Written Opinion, PCT/US2022/042190, Dec. 19, 2022, 16 pgs.

* cited by examiner

*Primary Examiner* — Norman Yu
(74) *Attorney, Agent, or Firm* — Morgan, Lewis & Bockius LLP

(57) ABSTRACT

In one embodiment, a microphone with swappable grilles is described. The microphone comprises a microphone body having a lower portion and an upper portion. The microphone also includes electronics disposed in at least the lower portion. The microphone also comprises, an audio transducer disposed in the upper portion and electronically coupled to the electronics. The microphone also includes two, optionally substantially planar, grilles each disposed on an opposite side of the upper portion, where the two grilles are configured to removably attach to the upper portion.

23 Claims, 13 Drawing Sheets

Frequency Response of Art Deco Grille on Front and Back

Frequency Response of Window Grille on Front and Back

Frequency Response of Art Deco Grille on Front and Window Grille on Back

MICROPHONE WITH INTERCHANGEABLE GRILLES FOR ACOUSTICALLY FILTERING INCOMING AUDIO SIGNALS

RELATED APPLICATIONS

This application claims priority to U.S. Provisional Patent Application No. 63/239,378, filed Aug. 31, 2021, which is hereby incorporated by reference in its entirety.

TECHNICAL FIELD

The present disclosure relates generally to microphones used for recording music, instruments, vocals, dialogue, film, radio, podcasts, video games, and other audio sources. More particularly, this invention relates to a microphone that has grilles that are both modular and swappable by the end user. In some embodiments, the grilles change the appearance and/or alter the overall frequency response of the microphone.

BACKGROUND

Traditionally, microphones either have a fixed grille that cannot be removed or have a conventional singular removable grille that is fixed and not removable, or removable for servicing, and has a single functional appearance. While generally satisfactory, a fixed grille on a microphone lacks versatility for use in different recording environments, settings, and applications. Every different brand of microphone has its own set frequency response designed for a single specific application, instrument, and environment. Musicians, therefore, often have multiple different microphones for different environments, e.g., a recording studio or a live event.

Traditional microphone grilles are intended to protect the recording element, commonly referred to as a ribbon, capsule, capacitor, or cartridge, from wind blasts and dirt, all while remaining relatively acoustically transparent. As a result, conventional grilles are of marginal value in changing the frequency response of the microphone. As such, it would be desirable to provide devices and methods that address the above-mentioned drawbacks by providing a more versatile microphone that has swappable grilles for changing the appearance of the microphone and/or for altering a frequency response of the microphone.

SUMMARY

Accordingly, there is a need for a microphone that has swappable grilles for changing the appearance of the microphone and/or for altering a frequency response of the microphone. In some embodiments, the microphone includes a microphone body that houses a microphone with optionally associated electronics. In some embodiments, a perforated structure and a fabric or mesh-like material are fitted to acoustically filter (e.g., alter) audio received by the microphone. Conveniently, in some embodiments, the grilles can be removed without tools by prying the grilles off the microphone with a finger, coin, flat screwdriver, guitar pick or the like, that is thin enough to fit between the edge of the grille and the microphone body. These swappable grille pieces not only allow for quickly customizing the microphone's appearance, but also allow for easy customization of the audio characteristics of the microphone, including the microphone's frequency response. A user of the microphone can swap-in various grilles that each differently change the frequency response of the microphone. This allows users to tailor their experience to their needs for each performance or media type. For example, a first grille type may produce a desired frequency response of the microphone for a music recording studio, and a second grille type may be more suitable for a live event. Conveniently, having changeable grilles does not require the musical artist or sound technician to travel with numerous microphones, and instead only needs to keep a set of small interchangeable grilles.

(A1) In some embodiments, a microphone (e.g., microphone 100 illustrated in FIG. 1) with swappable grilles comprises a microphone body having a lower portion and an upper portion. In some embodiments, the microphone can be configured to be a studio microphone, a live performance microphone, a stage microphone, a gaming/streaming microphone, etc., For example, the microphone body 106 in FIGS. 1 and 2, which are structural housings made of either metal (e.g., aluminum, steel, etc.,), plastic, or a composite. In some embodiments, the lower portion and upper portion are integrally formed together, as shown by upper portion (802 and 902), and lower portion (804 and 904) of the microphone body 106 in FIGS. 8 and 9, respectively. In some embodiments, electronics are disposed in at least the lower portion. For example, FIGS. 8 and 9 illustrate associated electronics 803 and 903 (e.g., electronics for enabling audio recording). In some embodiments, the microphone body includes additional portions than the lower portion and the upper portion, as illustrated by the three regions shown in FIG. 18 that make up the microphone's body, including, a first region 1802, a second region 1804, and a third region 1806 (analogues features are shown in FIG. 19). In some embodiments, the microphone body and/or grilles include displays, switches, knobs, and/or buttons to control features of the microphone, such as volume, polar pattern, lighting (e.g., of the microphone or stage), and electronic EQ. In some embodiments, a microphone (e.g., a microphone diaphragm or any recording device that can receive audio inputs) is disposed in the upper portion and electronically coupled to the associated electronics. For example, the upper portion includes one or more cutouts for allowing insertion of a microphone. FIG. 9 illustrates an example where the condenser microphone 900 (e.g., a microphone diaphragm) is placed within an upper portion 902 of the microphone body. In some embodiments, two, optionally substantially planar, grilles are disposed on opposite sides of the upper portion. FIG. 2 shows an example of an interchangeable-top-front grille 102, interchangeable-bottom-front grille 104, interchangeable-top-rear grille 202, and interchangeable-bottom-rear grille 204.

In some embodiments, the grilles can be non-planar grilles (e.g., one or more of the grilles has rounded shape, a curved shape, a non-uniform shape, a concave shave etc.). In some embodiments, one or more grilles are only removable on one side (e.g., a face) of the microphone body. For example, this one side of the microphone can be the side in which an artist speaks/sings into (e.g., the frontside). In some embodiments, the grilles on the backside of the microphone are semi-permanent, meaning the grilles on one side are more difficult to remove than the other (e.g., one side may be removable via pull tabs, while the other side is affixed by screws or a strong adhesive). In some embodiments, the backside of the microphone body does not have any cutouts and is an enclosed surface (e.g., a planar or non-planar surface). In some embodiments, only a single grille is placed on opposing sides of the microphone body. In some embodiments, grilles may be placed on adjacent surfaces in addition to opposing surfaces. In some embodiments, when an upper grille and a lower grille are placed on at least one side of the microphone body, the lower grille is not removable (e.g., not removable at least by the end user) and the upper grille is removable by the end user. In some embodiments, the grilles are made of one or more of metal, plastic, or composites. In some embodiments, a grille is produced using techniques such: laser cutting, water jet cutting, 3D printing, die cutting, CNC machining, cutting by hand, using clay, injection molding, and/or casting. In some embodiments, the grilles are also configured to protect the microphone from extraneous noise produced by windblasts.

In some embodiments, the two, optionally substantially planar, grilles are placed on the largest face of the microphone body. In some embodiments, the two, optionally substantially planar, grilles are configured to be removably attached to the upper portion. In some embodiments, the two, optionally substantially planar, grilles are placed in, and optionally substantially fill, a corresponding one or more cutouts. In some embodiments, the two, optionally substantially planar, grilles are user hot-swappable. For example, two, optionally substantially planar, grilles may be swapped while the device is powered and in use. In some embodiments, the grilles may include electronic componentry (e.g., LEDs, displays, sensors, connection sensors, etc., that are capable of being swapped in while the device is in use. In some embodiments, the grilles connection points can also include electrical paths for transmitting power and/or data. In some embodiments, the grille and/or the microphone body have an additional surface finish, such as a powder-coated paint, a ceramic coating, are nickel plated, or have a brushed. Wood, and/or acrylic finish.

In some embodiments, a system for swapping microphone grilles comprises a microphone housing that has a first flat surface that opposes a second flat surface. In some embodiments, both the first flat surface and the second flat surface each have one or more cutouts that reveal an interior of the microphone housing. In some embodiments, the system comprises a recording device placed within the interior of the microphone housing for recording incoming sound waves. In some embodiments, the system comprises a set of two removably attachable (e.g., user hot-swappable (e.g., the one or more swappable integrated audio devices may be swapped while the device is powered and in use)) microphone grilles that include, a first microphone grille and a second microphone grille. In some embodiments, the first microphone grille is configured to be removably attached to one of the cutouts of the one or more cutouts of the first flat surface (e.g., and first microphone grille substantially fills all of the one of the cutouts), and the second microphone grille is configured to be removably attached to one of the cutouts of the one or more cutouts of the second flat surface (e.g., and second microphone grille substantially fills all of the one of the cutouts).

(A2) In some embodiments of (A1), at least one of the grilles defines a pattern of holes therethrough. For example, FIGS. 10A through 10E illustrate numerous interchangeable grille designs that include patterns of holes passing therethrough.

(A3) In some embodiments of (A1)-(A2), at least one of the grilles has a pattern of holes therethrough and the pattern of holes is a uniform/non-uniform pattern. For example, while some of the FIGS. 10A through 10E show repeating patterns, it is possible to have a non-repeating non-uniform pattern, such as a random placement of holes therethrough.

(A4) In some embodiments of (A1)-(A3), at least one of the grilles has a pattern of holes therethrough and the pattern of grilles is a decorative pattern (e.g., an art deco style pattern (e.g., FIG. 10A), a hole pattern (e.g., FIG. 10B), a scale pattern (e.g., FIG. 10C), a striped pattern (e.g., FIG. 10D), a windowed pattern (e.g., FIG. 10E), etc.,).

(A5) In some embodiments of (A1)-(A4), at least one of the grilles has a pattern of holes therethrough and the pattern of grilles is a grid of holes (e.g., FIG. 10B illustrates a grid of holes pattern).

(A6) In some embodiments of (A1)-(A5), the audio transducer includes at least one of a condenser microphone (e.g., FIG. 8 illustrates a condenser microphone), a ribbon microphone (e.g., FIG. 9 illustrates a ribbon microphone), or both condenser and ribbon microphones. In some embodiments, the microphone is optionally coupled to electronics. In some embodiments, the microphone includes one or more dynamic microphone (e.g., a moving coil microphone), carbon microphone, a piezoelectric microphone, a fiber-optic microphone, a microelectromechanical system (MEMS) microphone. In some embodiments, the ribbon microphone consists of a thin piece of corrugated aluminum that is suspended between two magnets in a magnetic field. In some embodiments, the ribbon microphone produces sound via electromagnetic inductance. The ribbon microphone has either a passive design without electronics or includes electronics, such as an active buffer board, that changes the impedance of the microphone. In some embodiments, the ribbon microphone can operate with either no electronics or electronics. In some embodiments, condenser microphone has a capsule, also known as a capacitor. In some embodiments, the capsule includes a diaphragm that acts as one plate of a capacitor, and the vibrations from sound waves produce changes in the distance between the plates. In some embodiments, the condenser microphone is powered with solid state electronics (e.g., a field-effect transistor (FET). In some embodiments, the condenser microphone is powered with a tube (or valve). In some embodiments, the microphone is a USB microphone that includes digital electronic componentry to interact with a computer (e.g., a cellphone, a laptop, recording equipment, etc.,). In some embodiments, the microphone body includes one or more microphones (e.g., two microphones, three microphones, four microphones, five microphones, a plurality of capsules for a plurality of ambisonic microphones (e.g., 64 capsules), etc.). In some embodiments, two microphones (e.g., recording elements) are placed in the microphone body, which causes stereo audio to be recorded. In some embodiments, the microphones are placed on a horizontal axis or a vertical axis within the microphone body. In some embodiments, the microphone body houses two capsule microphones. In some embodiments, the microphone body houses two ribbon microphones. In some embodiments, the microphone body houses, a capsule microphone and a ribbon microphone.

(A7) In some embodiments of (A1)-(A6), an audio output (e.g., a wired audio hookup, a wireless transmitter (e.g., a Bluetooth transmitter, RF transmitter, etc.,)) is placed at a bottom of the microphone body. In some embodiments, the bottom of the microphone body includes a connection point to affix the microphone body to a microphone stand. In some embodiments, a wireless transmitter is integrated into the electronics and no physical audio output is placed on the microphone body.

(A8) In some embodiments of (A1)-(A7), the microphone comprises two more (e.g., two additional), optionally substantially planar, grilles, wherein the two more, optionally substantially planar, grilles (e.g., an upper windowed grille design 1016 that and a lower windowed grille design 1018 shown in FIG. 10E) replace (e.g., swapped for) the two, optionally substantially planar, grilles (e.g., upper art deco grille design 1002 and lower art deco grille design 1004 shown in FIG. 10A). In some embodiments, the two more, optionally substantially planar, grilles, when removably attached to the microphone body, are configured to manipulate incoming sound waves to produce a first manipulated audio to be received by the microphone (e.g., FIG. 12 illustrates a frequency response curve 1200 that corresponds to the window grilles shown in FIG. 10E). In some embodiments, the two, optionally substantially planar, grilles, when removably attached to the microphone body, are configured to manipulate incoming sound waves to produce a second manipulated audio to be received by the microphone (e.g., FIG. 11 illustrates a frequency response curve 1100 that corresponds to the art deco grilles shown in FIG. 10A). In some embodiments, the second manipulated audio is different from the first manipulated audio (e.g., the frequency response curve 1100 of FIG. 11 is different than (e.g., not the same as) the frequency response curve 1200 of FIG. 12). In some embodiments, the first manipulated audio corresponds to a first frequency response and the second manipulated audio corresponds to a second frequency response. In some embodiments, the first frequency response is substantially the same as the second frequency response. In some embodiments, one or more grilles can be stacked on top of the already attached grilles to further change the frequency response, to change the appearance, and/or to further protect the microphone from extraneous noise produced by windblasts.

(A9) In some embodiments of (A1)-(A8), the electronics are configured to produce a first frequency response corresponding to the first manipulated audio (e.g., the frequency response curve 1200 in FIG. 12), and the electronics are configured to produce a second frequency response corresponding to the second manipulated audio (e.g., the frequency response curve 1100 in FIG. 11). In some embodiments, the first frequency response is different from second frequency response, or the first frequency response is substantially the same as the second frequency response).

(A10) In some embodiments of (A1)-(A9), two more, optionally substantially planar, grilles are each disposed on an opposite side of the lower portion (e.g., where the grilles are placed on the largest face of the microphone body), where the two more, optionally substantially planar, grilles are configured to removably attach to the lower portion (e.g., FIGS. 3 and 4 illustrate interchangeable-bottom-front grille 104 and interchangeable-bottom-rear grille 204 being inserted into the microphone body 106). In some embodiments, the lower portion is enclosed on at least four sides. In some embodiments, the lower grilles are coplanar with the upper grilles. In some embodiments, the lower grilles are not coplanar with the upper grilles.

(A11) In some embodiments of (A1)-(A10), the two more, optionally substantially planar, grilles are different in size from the two, optionally substantially planar, grilles (e.g., FIGS. 3 and 4 illustrate that interchangeable-top-front grille 102 and interchangeable-top-rear grille 202 are larger than, interchangeable-bottom-front grille 104 and interchangeable-bottom-rear grille 204). For example, the two more, optionally substantially planar, grilles are smaller than the two, optionally substantially planar, grilles.

(A12) In some embodiments of (A1)-(A11), each removably attachable microphone grille includes a (e.g., perforated) fabric structure encompassing substantially all of each grille (e.g., FIG. 3 illustrates optional mesh component 304). In some embodiments, the fabric structure manipulates incoming sound waves, and alters a frequency response of the microphone. In some embodiments, one or more fabrics may also be used to reduce moisture from interacting with the electrical recording device. In some embodiments, the fabric is constructed of either nylon, polyester, woven acrylic fabric, synthetic fibers, carbon foam, open-cell foam, monofilament fiber, wire mesh, plastic, metals (e.g., steel, stainless steel, aluminum, brass, etc.,), etc. In some embodiments, each of the fabrics listed above provide a different acoustic quality. For example, a denser material mesh component can muffle the incoming audio more than a less dense mesh component. In some embodiments, multiple meshes may be used at the same time to tailor the microphone to the end user's needs. Multiple meshes can include either stacking more meshes in a single grille and/or having each grille have different mesh component. In some embodiments, the fabric structure can be swapped without changing the other components of the grille (e.g., the patterned rigid grille filter). In some embodiments, the fabric structure provides wind protection and higher sound pressure level (SPL).

(A13) In some embodiments of (A1)-(A12), the two, optionally substantially planar, grilles are affixed to the microphone body using either or a combination of magnet coupling, screw coupling, press-fit coupling, hook and loop coupling, adhesive coupling (e.g., double sided tape), and/or latch coupling. For example, FIGS. 5-7 show a subset of the couplings discussed above.

(A14) In some embodiments of (A1)-(A13), the grille includes a mounting bracket (e.g., a surround), wherein a patterned grille plate (e.g., a piece that has one or more holes therethrough) and/or a mesh component is affixed to the mounting bracket (e.g., via glue, press-fit, tabs, etc.,) and the mounting bracket is configured to be affixed to the microphone body (e.g., using either magnet coupling, screw coupling, press-fit coupling, hook and loop coupling, adhesive coupling (e.g., double sided tape-, and(/or) latch coupling). For example, FIG. 3 illustrates the construction of an example grille 300 that includes three separate components, a grille component 302 (e.g., patterned grille plate), an optional mesh component 304, and a surround component 306 that is also a mounting bracket.

(A15) In some embodiments of (A1)-(A14), the microphone body is a single rigid piece of material (e.g., a metal construction, a plastic construction, a composite construction, etc.,). For example, FIG. 1 shows the microphone body 106 being a single piece of material.

In some embodiments, the microphone body is milled from a block of material, injected molded, 3D printed, or welded together.

(A16) In some embodiments of (A1)-(A15), the two, optionally substantially planar, grilles each include a tab for removing each grille from the microphone body. In some embodiments, the tab is substantially perpendicular to a face of the grille.

(A17) In some embodiments of (A1)-(A16) removing each grille from the microphone body requires a pulling force on the tab in a substantially linear direction. In some embodiments, no tools are required for removing the grille.

(A18) In some embodiments of (A1)-(A17), the two grilles are substantially planar (e.g., flat).

(B1) In some embodiments, a method of producing a microphone with swappable grilles (e.g., FIG. 14), comprises providing (e.g., constructing or producing) a microphone body (e.g., a structural housing) having a lower portion and an upper portion. In some embodiments, the lower portion and upper portion are integrally formed together. The method includes, disposing (e.g., coupling) electronics in at least the lower portion (e.g., electronics for enabling audio recording) and disposing (e.g., coupling) a microphone (e.g., an audio transducer or any recording device that can receive audio inputs) in the upper portion and electronically coupled to the electronics (e.g., the upper portion includes one or more cutouts). The method also includes disposing (e.g., coupling) two, optionally substantially planar, grilles each on an opposite side of the upper portion (wherein the grilles are placed on the largest face of the microphone body), where the two grilles are configured to removably attach to the upper portion (e.g., the two grilles are placed in, and optionally substantially fill, a corresponding one or more cutouts)(e.g., user hot-swappable (e.g., the one or more swappable integrated audio devices may be swapped while the device is powered and in use)). In some embodiments, two grilles are on parallel planes to each other. In some embodiments, the grilles are not on parallel planes to each other, as illustrated by the example microphones 1800 and 1900 shown in FIGS. 18 and 19, respectively.

(C1) In some embodiments, a method of switching grilles (e.g., FIG. 15), occurs at a microphone that includes a microphone body having a lower portion and an upper portion, wherein the upper portion includes an audio transducer and the lower portion includes electronics that are coupled to the audio transducer. In some embodiments, a first set of grilles with a first acoustic altering property is removably attached to the microphone body. In some embodiments, a received audio is manipulated, via the first set of grilles with the first acoustic altering property, to produce a first manipulated audio. In some embodiments, in response to receiving the first manipulated audio, producing, via the audio transducer and the electronics a first frequency response. In some embodiments, the microphone body includes additional portions over and above the lower portion and the upper portion, as illustrated by the three regions shown in FIG. 18 that make up the microphone's body, including, a first region 1802, a second region 1804, and a third region 1806 (analogues features are shown in FIG. 19).

(C2) In some embodiments of (C1), the first set of grilles is replaced with a second set of grilles, where the second set of grilles has a second acoustic altering property. In some embodiments, the received audio is manipulated, via a second set of grilles with the second acoustic altering property, to produce a second manipulated audio. In some embodiments, in response to receiving the second manipulated audio, producing, via the audio transducer and the electronics a second frequency response.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered exhaustive illustrations of every possible embodiment, for the description may admit to other effective features consistent with the inventive aspects described herein as the person of skill in this art will appreciate upon reading this disclosure.

Figure 1:
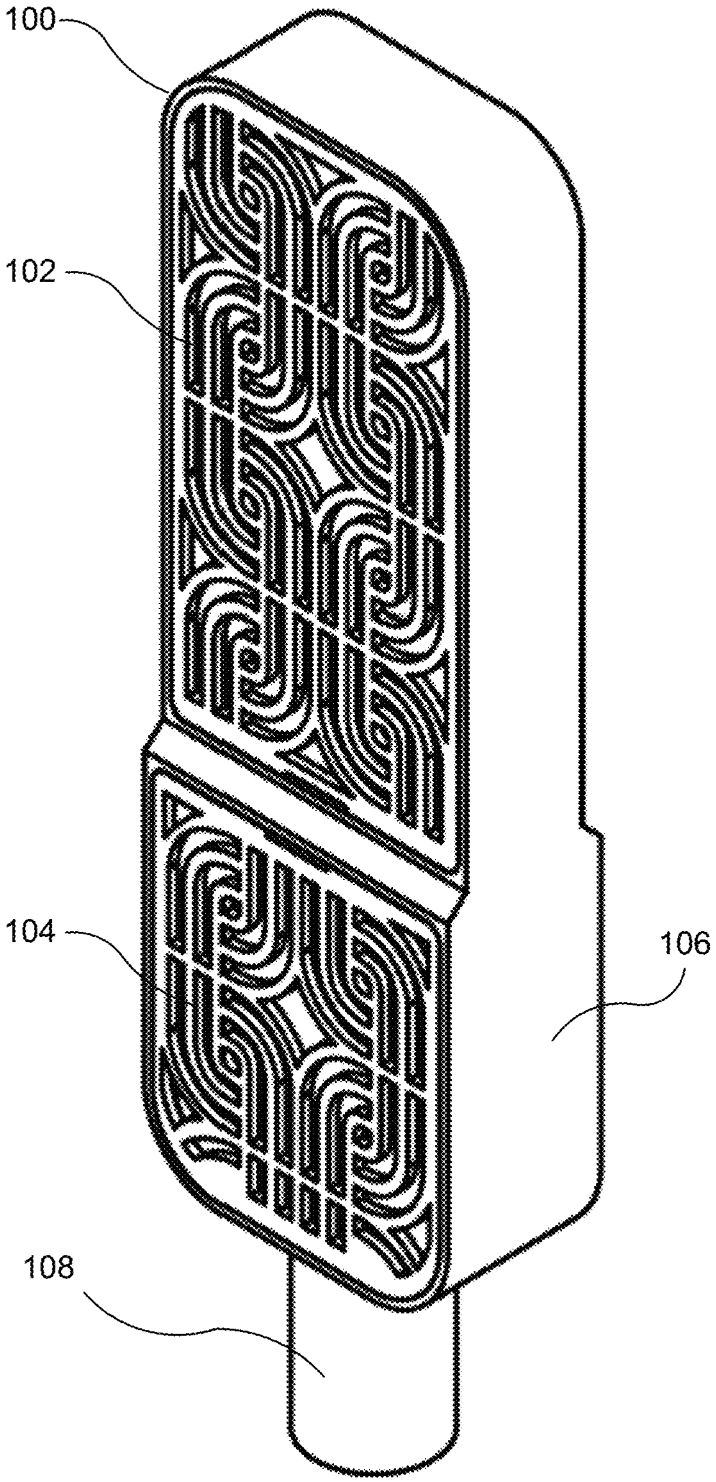
FIG. 1 shows a perspective view of an exemplary microphone system 100 that is configured to receive one or more grilles placed over a recording device of the microphone system, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein in order to provide a thorough understanding of the non-limiting example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

The microphone system discussed below in relation to FIGS. 1-21, allows the end user of the microphone system to adjust a frequency response and/or appearance of the microphone by interchanging grilles of the microphone. The grilles of the microphone can be easily swapped out using different techniques to allow the user to quickly tailor their frequency response to their preference. Interchanging different grille designs allows the end user to quickly alter the frequency response of the microphone without the need for switching microphones or audio editing software.

FIG. 1 shows an exemplary microphone system 100 that is configured to receive one or more grilles placed over a recording device of the microphone system. In some embodiments, interchangeable-top-front grille 102 and interchangeable-bottom-front grille 104 are removably affixed to the microphone body to manipulate incoming audio (e.g., alter the frequency response of the incoming audio). In some embodiments, interchangeable-top-front grille 102 and interchangeable-bottom-front grille 104 are duplicated on the backside of the microphone body (see e.g., FIG. 2). In some embodiments, the duplicated grilles on the backside of the microphone are parallel to the grilles placed on the front of microphone body. In some embodiments, the grilles on the front and back are not parallel to each other. FIG. 1 also illustrates a stem 108 affixed to or integrally formed into the bottom (e.g., lower portion) of the microphone body 106. The stem 108 allows for the microphone system to be coupled to a microphone stand.

Figure 2:
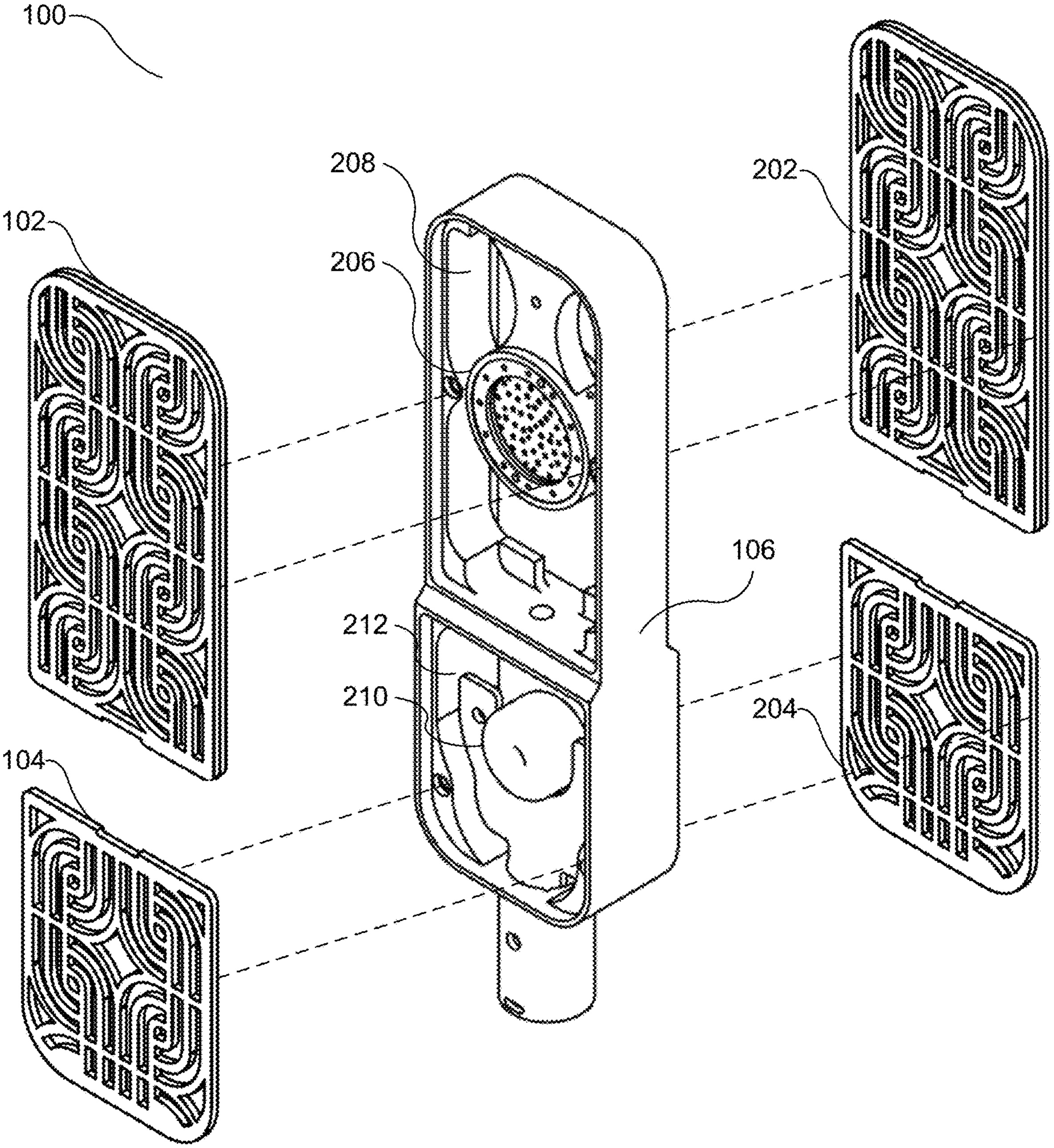
FIG. 2 shows a perspective view of an exemplary partial exploded view of the microphone system 100, in accordance with some embodiments.

FIG. 2 shows an exemplary partial exploded perspective view of the microphone system 100. The four grilles (e.g., interchangeable-top-front grille 102, interchangeable-bottom-front grille 104, interchangeable-top-rear grille 202, and interchangeable-bottom-rear grille 204) are disconnected from the microphone body 106 to reveal the interior of the microphone body 106 that contains a recording device 206 (e.g., a microphone) in an upper portion 208 of the microphone body 106 and associated electronics 210 in a lower portion 212 of the microphone body 106, which in this embodiment is a condenser microphone. The four grilles are affixed to the microphone body 106 using one or more of the mounting types discussed in FIGS. 5-7. In some embodiments, the bottom-interchangeable grilles and top-interchangeable grilles use different mounting types. For example, the bottom-interchangeable grilles can be permanently or semi-permanently affixed (e.g., requiring tools to remove (e.g., using screws)) to microphone body 106. While FIG. 2 shows the top-interchangeable grilles and the bottom-interchangeable grilles being different in size, in some embodiments, the top-interchangeable grilles and the bottom-interchangeable grilles are substantially the same size. In some embodiments, the top-interchangeable grilles are smaller or larger in area than the bottom-interchangeable grilles.

Figure 4:
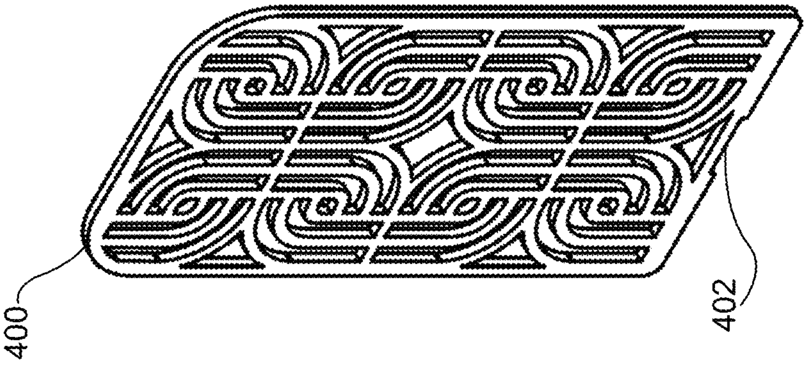
FIG. 4 illustrates a perspective view of an exemplary view of a grille that is configured to be removably attached to a microphone body, in accordance with some embodiments.
Figure 3:
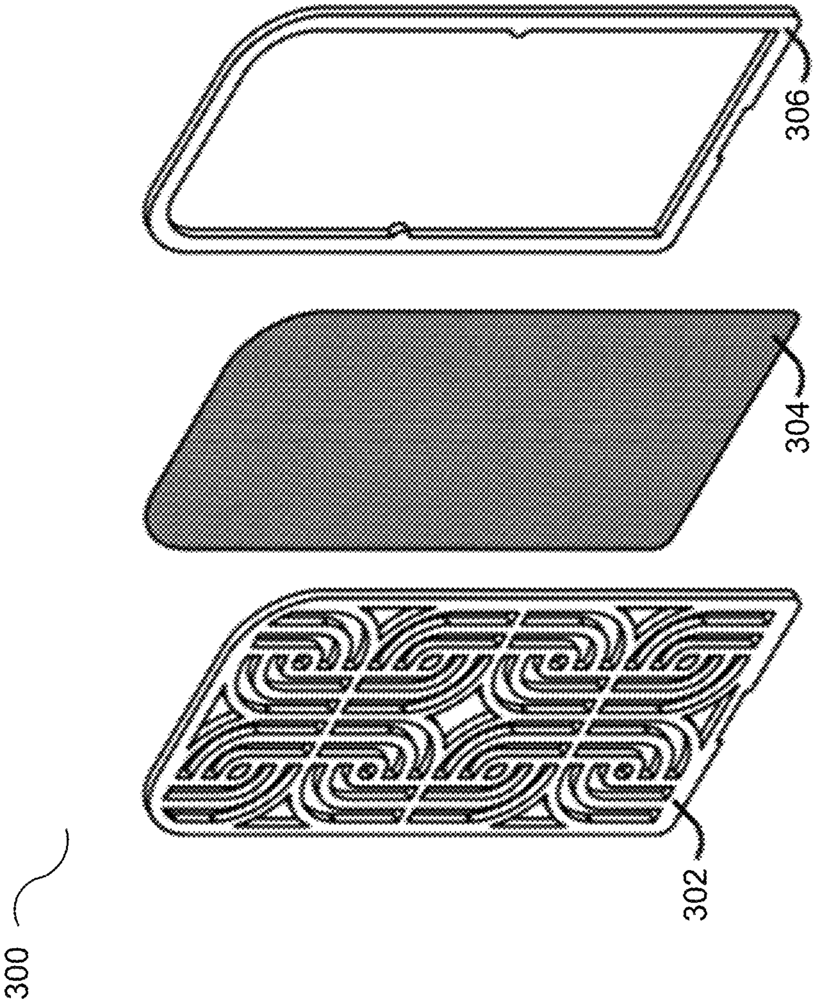
FIG. 3 illustrates a perspective view of an exemplary exploded view of a grille that is configured to be removably attached to a microphone body, in accordance with some embodiments.
Figure 7:
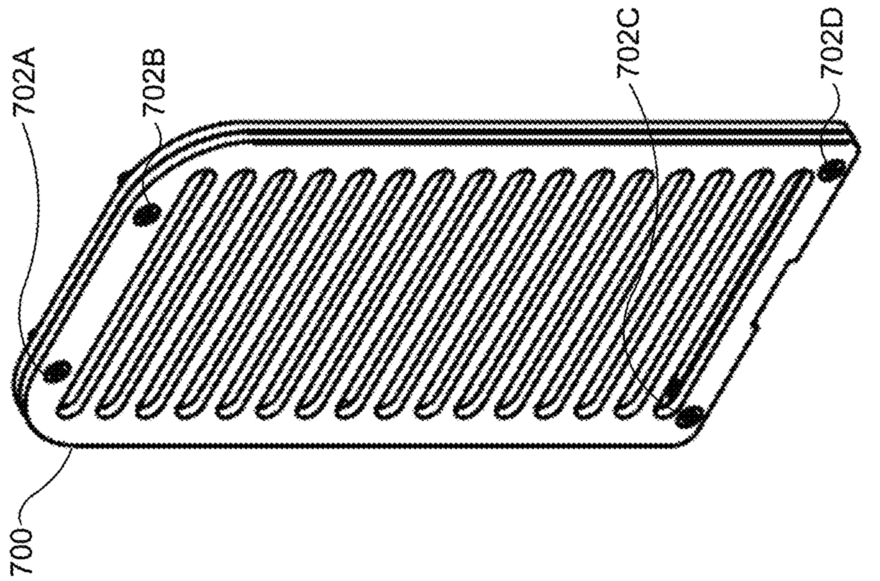
FIG. 7 illustrates a perspective view of an exemplary coupling method for removably attaching a grille to a microphone body, in accordance with yet other embodiments.
Figure 6:
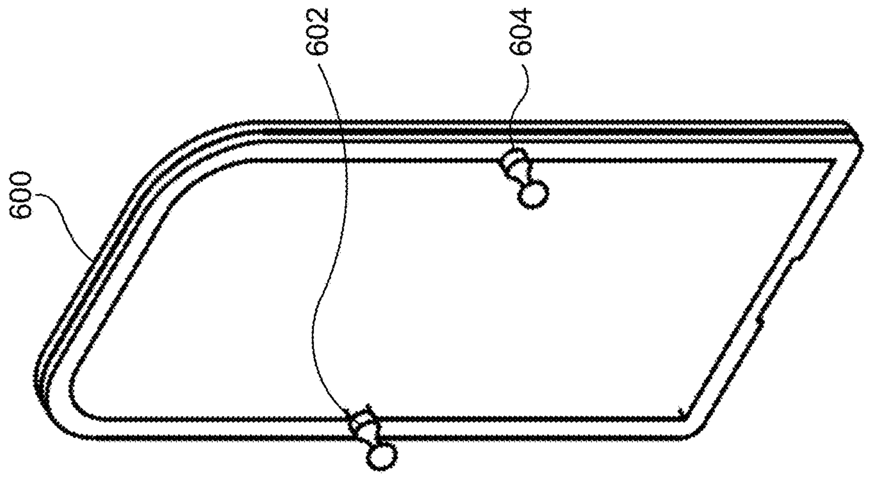
FIG. 6 illustrates a perspective view of an exemplary coupling method for removably attaching a grille to a microphone body, in accordance with some other embodiments.
Figure 5:
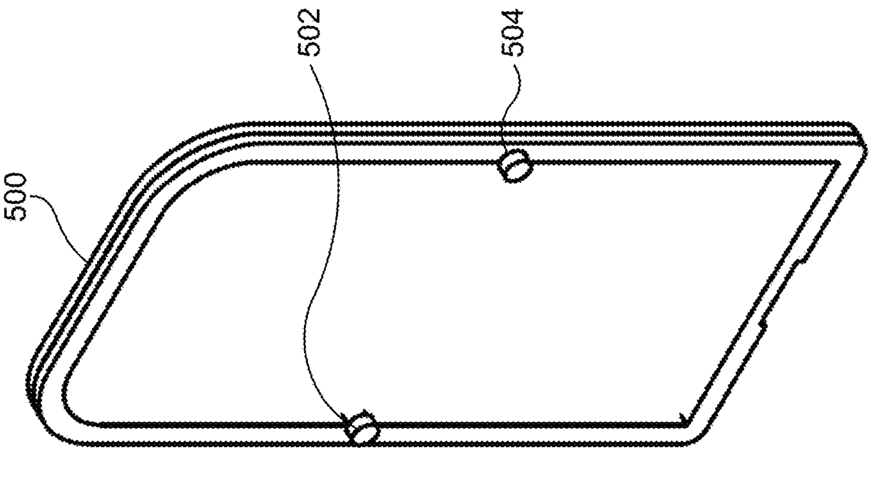
FIG. 5 illustrates a perspective view of an exemplary coupling method for removably attaching a grille to a microphone body, in accordance with some embodiments.

FIGS. 3 and 4 illustrate an example embodiment for how the grilles (e.g., interchangeable-top-front grille 102, interchangeable-bottom-front grille 104, interchangeable-top-rear grille 202, and interchangeable-bottom-rear grille 204) are constructed. In some embodiments, example grille 300 in FIG. 3 includes three separate components, a grille component 302, an optional mesh component 304, and a surround component 306. Grille component 302, optional mesh component 304, and surround component 306 are all fixed together to produce a grille, e.g., any one of the four grilles discussed above. In some embodiments, surround component 306 is optionally configurable to include mounting mechanisms (see, FIG. 5-7 illustrating a subset of mounting mechanisms). In some embodiments, surround component 306 provides support for the grille component 302, optional mesh component 304. In some embodiments, grille component 302 is configured to manipulate incoming audio, protect sensitive electrical and microphone componentry from physical impacts, and/or provide a visual appearance. In some embodiments, optional mesh component 304 is configured to further manipulate incoming audio, protect sensitive electrical and microphone componentry from moisture, and/or provide a visual appearance. In some embodiments, the optional mesh component may come various colors to designate different acoustical properties (e.g., a certain color or shade may denote its density and/or filtering capabilities). These components can be affixed together using a combination of adhesives, mechanical coupling (e.g., press-fits, tabs, screws, etc.). Lastly, FIG. 4 illustrates a fully assembled grille 400 that includes grille component 302, optional mesh component 304, and surround component 306. In some embodiments, grille 400 includes a tab and/or divot 402 on the grille that allows the user to easily remove the grille 400 from the microphone body 106. In some embodiments, the tab may be a cloth tab, optionally integrated into the mesh component 304, to allow the user to pull the tab to remove the entire example grille 300 from the microphone body. In some embodiments, the tab protrudes perpendicularly from the example grille 300. In some embodiments, the grilles may be easily stackable for transportation and may connect with each other using any of the mounting mechanisms discussed above. In some embodiments, multiple grilles may attach to the microphone body for transportation and for further manipulating incoming sound waves.

FIGS. 5-7 illustrate three different coupling methods for fixing the grille 102, 104, 202, and 204 to the microphone body 106, as pictured in FIG. 2. FIG. 5 illustrates a coupling method that uses magnets (e.g., magnet 502 and magnet 504 affixed to grille 500). In some embodiments, the corresponding mating surface of the microphone body has magnets. In some embodiments, the magnets can be continuous magnetic strip or one or more separate magnets generally surrounding the edge of the grille or the mating surface of the microphone body. In some embodiments, the magnets are only affixed to the surround component 500 when the microphone body 106 is a ferrous material (e.g., a magnetic material) or has a section of the body that is ferrous. In some embodiments, when the microphone body 106 is not a ferrous material, other magnets will be placed on or embedded into the microphone body 106, where the other magnets aligns with the magnets on surround 500 and have opposite poles to attract the magnets on the grille. In some embodiments, the coupling methods are configured so that the grilles can be removed with or without tools by using a fingernail or a tool thin enough to fit between the edge of the grille and the microphone body.

FIG. 6 illustrates a second coupling method using a press fit (e.g., press fit tab 602 and press fit tab 604) to secure surround 600 to the microphone body 106. The microphone body includes a corresponding receiving area for securing the press fit tab 602 and press fit tab 604. FIG. 7 illustrates a third coupling method using a screw mounting (e.g., screws 702A through 702D). The microphone body 106 includes corresponding (e.g., threaded) screw holes to fasten surround 700 to the microphone body 106. In some embodiments, the coupling methods include press-fit coupling, hook and loop coupling, adhesive coupling (e.g., double sided tape-, and/or latch coupling. While the mounting mechanisms are placed in specific orientations in FIGS. 5-7, it should be appreciated that other locations around the perimeter of the grille are also places in which these mounting mechanisms can be placed. In some embodiments, the mounting mechanisms are removable with or without tools. In some embodiments, the mounting mechanisms are attachable and/or removable with a linear force (e.g., a removing pulling force or attaching pushing force being applied to the grille).

Figure 8:
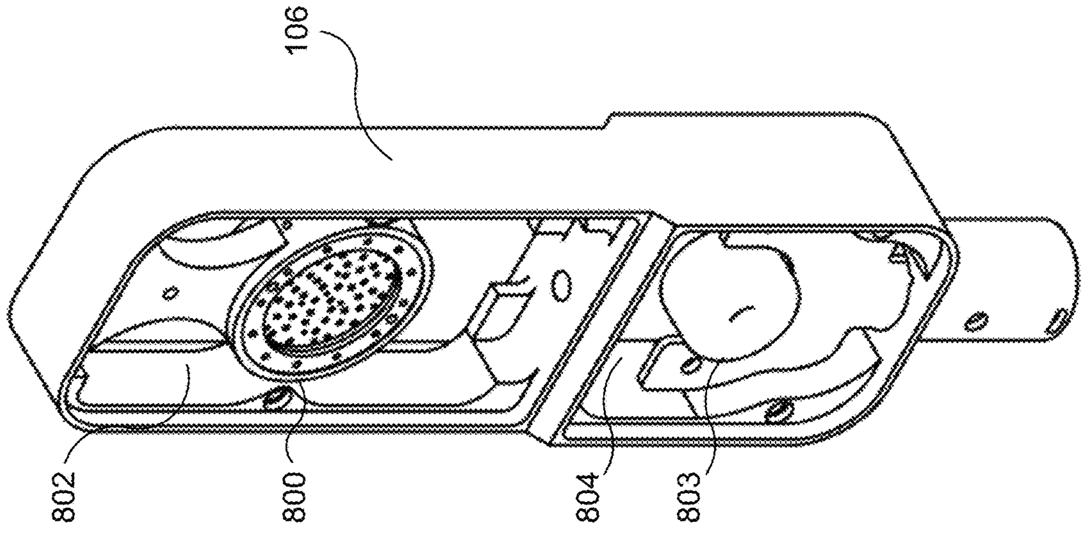
FIG. 8 illustrates a perspective view of a condenser microphone disposed within an upper portion microphone body, in accordance with some embodiments.
Figure 9:
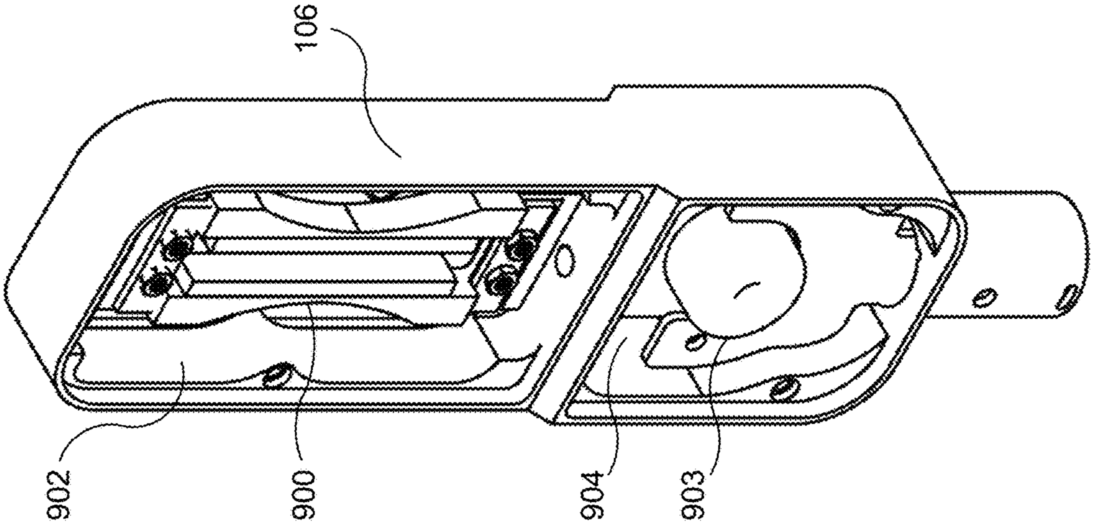
FIG. 9 illustrates a perspective view of a ribbon microphone placed within an upper portion of the microphone body, in accordance with some embodiments.

FIGS. 8 and 9 illustrates different types of microphones being placed within the upper portion of a microphone body. FIG. 8 illustrates that condenser microphone 800 is disposed within an upper portion 802 of the microphone body 106. FIG. 9 illustrates a ribbon microphone 900 disposed within an upper portion 902 of the microphone body. In some embodiments, the microphone body 106 in FIGS. 8 and 9 are both optionally configured to house associated electronics 803 and 903 in lower portion 804 and 904 of the microphone body 106, respectively.

Figure 10A:
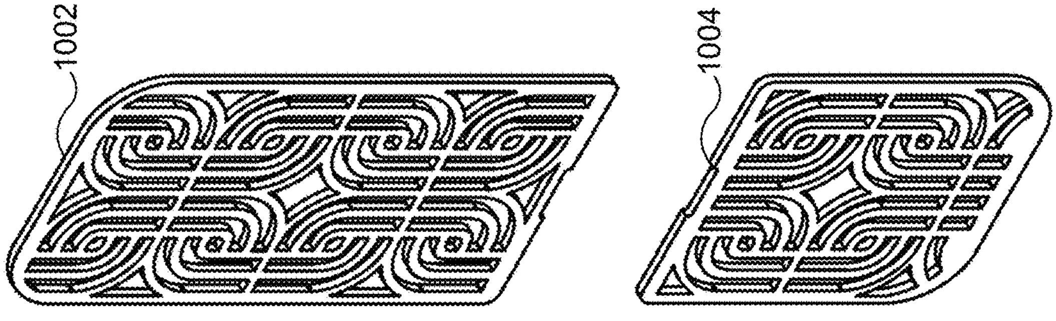
FIG. 10A illustrates a perspective view of an upper art deco grille design and lower art deco grille design, in accordance with some embodiments.
Figure 10B:
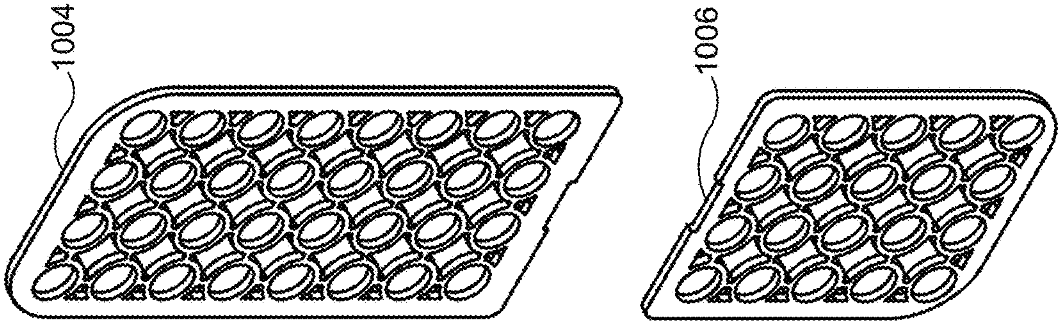
FIG. 10B shows a perspective view of an upper hole grille design and a lower hole grille design, in accordance with some embodiments.
Figure 10C:
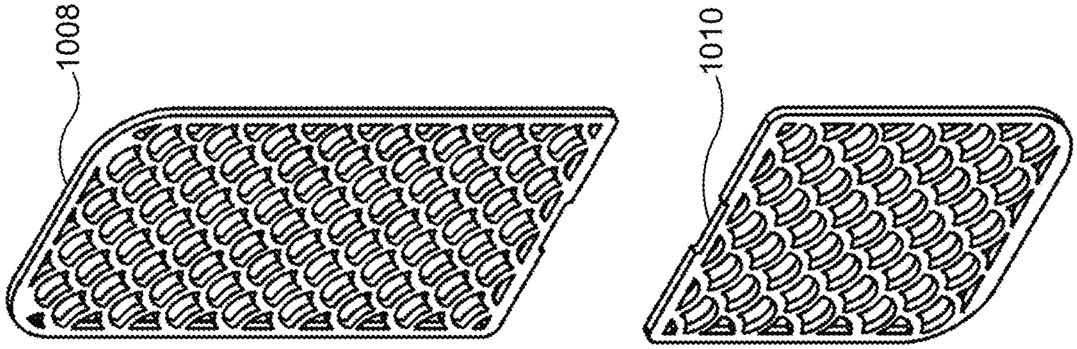
FIG. 10C illustrates a perspective view of an upper scale grille design and a lower scale grille design, in accordance with some embodiments.
Figure 10D:
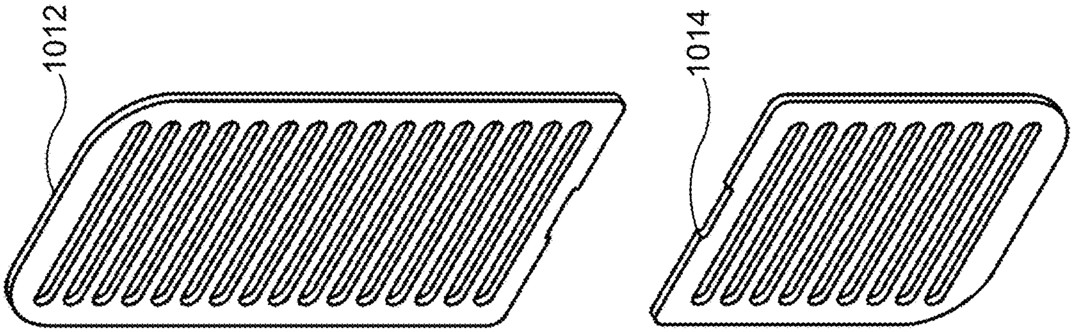
FIG. 10D illustrates a perspective view of an upper striped grille design and a lower striped grille design, in accordance with some embodiments.
Figure 10E:
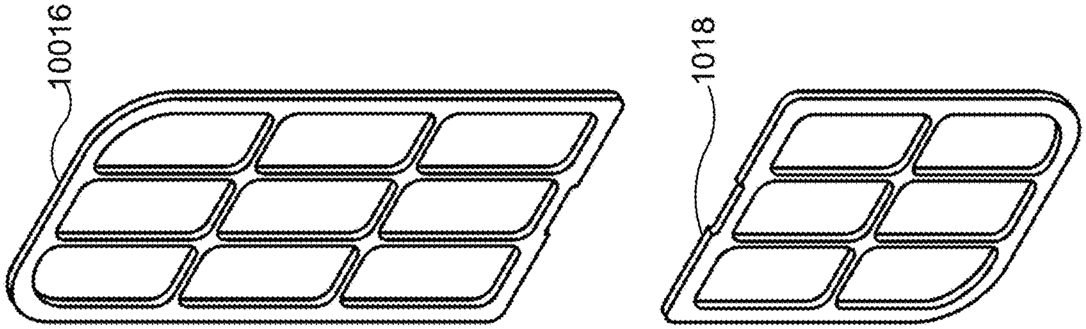
FIG. 10E illustrates a perspective view of an upper windowed grille design that and a lower windowed grille design, in accordance with some embodiments.

FIGS. 10A through 10E illustrate numerous interchangeable grille designs. FIG. 10A illustrates an upper art deco grille design 1002 and lower art deco grille design 1004 that are configured to produce a first frequency response. FIG. 10B shows an upper hole grille design 1006 and a lower hole grille design 1008 that are configured to produce a second frequency response. FIG. 10C illustrates an upper scale grille design 1010 and a lower scale grille design 1012 that are configured to produce a third frequency response. FIG. 10D illustrates an upper striped grille design 1014 and a lower striped grille design 1016 that are configured to produce a fourth frequency response. FIG. 10E illustrates an upper windowed grille design 1016 that and a lower windowed grille design 1018 that are configured to produce a fifth frequency response. In some embodiments, the first through fifth frequency responses are the same. In some embodiments, the first through fifth frequency responses are different (e.g., not the same).

Figure 11:
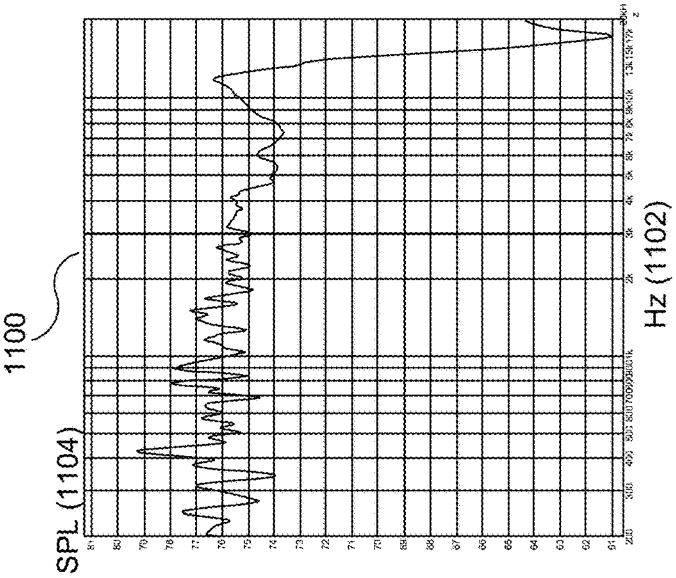
FIG. 11 illustrates an example frequency response curve corresponding to a first grille design (e.g., the art deco grille design shown in FIG. 10A), in accordance with some embodiments.
Figure 12:
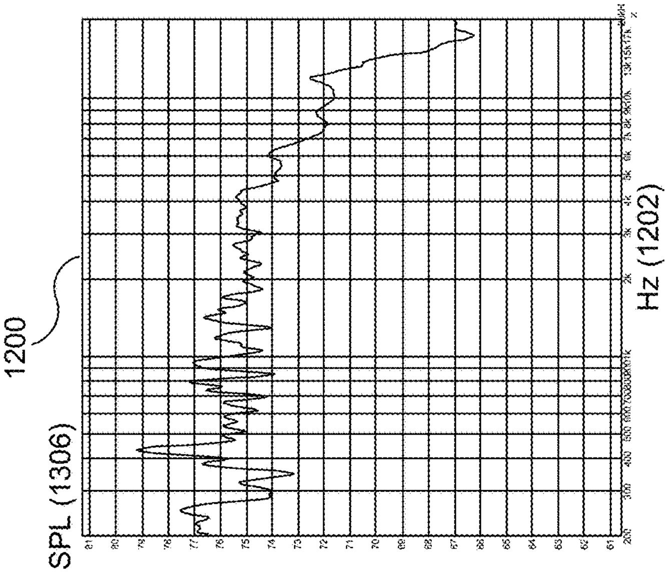
FIG. 12 illustrates an example frequency response curve corresponding to a second grille design (e.g., the window grille design shown in FIG. 10E), in accordance with some embodiments.
Figure 13:
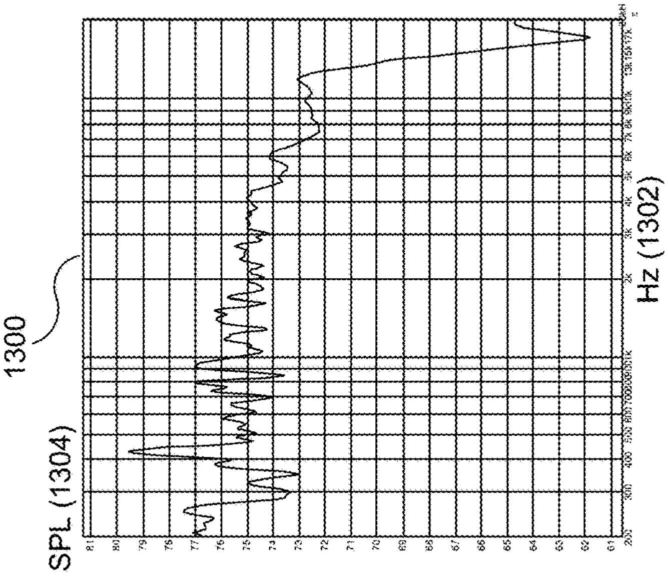
FIG. 13 illustrates an example frequency response curve 1300 corresponding to a mixed grille design, in accordance with some embodiments.

FIGS. 11-13 illustrate frequency response curves for a microphone with various differing microphone grilles attached. A frequency response curve illustrates a measurement of an output of the microphone's response to incoming sound waves (e.g., audio). As will be explained below, different microphone grilles can alter the microphones response to incoming sound waves. In other words, the frequency response curves explained below will illustrate how differing grilles alter acoustic qualities of incoming sound waves. FIG. 11 illustrates an example frequency response curve 1100 of a microphone when using a first grille design (e.g., the art deco grille design shown in FIG. 10A). Example frequency response curve 1100 has a horizontal axis 1102 that illustrates the frequency in Hertz (Hz) and a vertical axis that illustrates a sound pressure level (SPL) 1104. FIG. 12 illustrates another example frequency response curve 1200 of a microphone when using a second grille design (e.g., the window grille design shown in FIG. 10E). Example frequency response curve 1200 has a horizontal axis 1202 that illustrates the frequency in Hz and a vertical axis that illustrates a SPL 1204. The example frequency response curve 1100 for the first grille design (e.g., the art deco grille design) is different from the example frequency response curve 1200 of the second grille design (e.g., the window grille design). FIG. 13 illustrates an example frequency response curve 1300 of a microphone when using a mixed grille design (e.g., the art deco grille of FIG. 10A is placed on a side of the microphone body, and the windowed grille of FIG. 10E is placed on the opposing side of the microphone body). Example frequency response curve 1300 has a horizontal axis 1302 that illustrates the frequency in Hz and a vertical axis that illustrates a SPL 1304. This mixed grille design produces a third frequency response curve 1300, which is different from first frequency response curve 1200 and second frequency response curve 1200. In some embodiments, optional mesh component 304 can further alter the frequency response curve.

Figure 14:
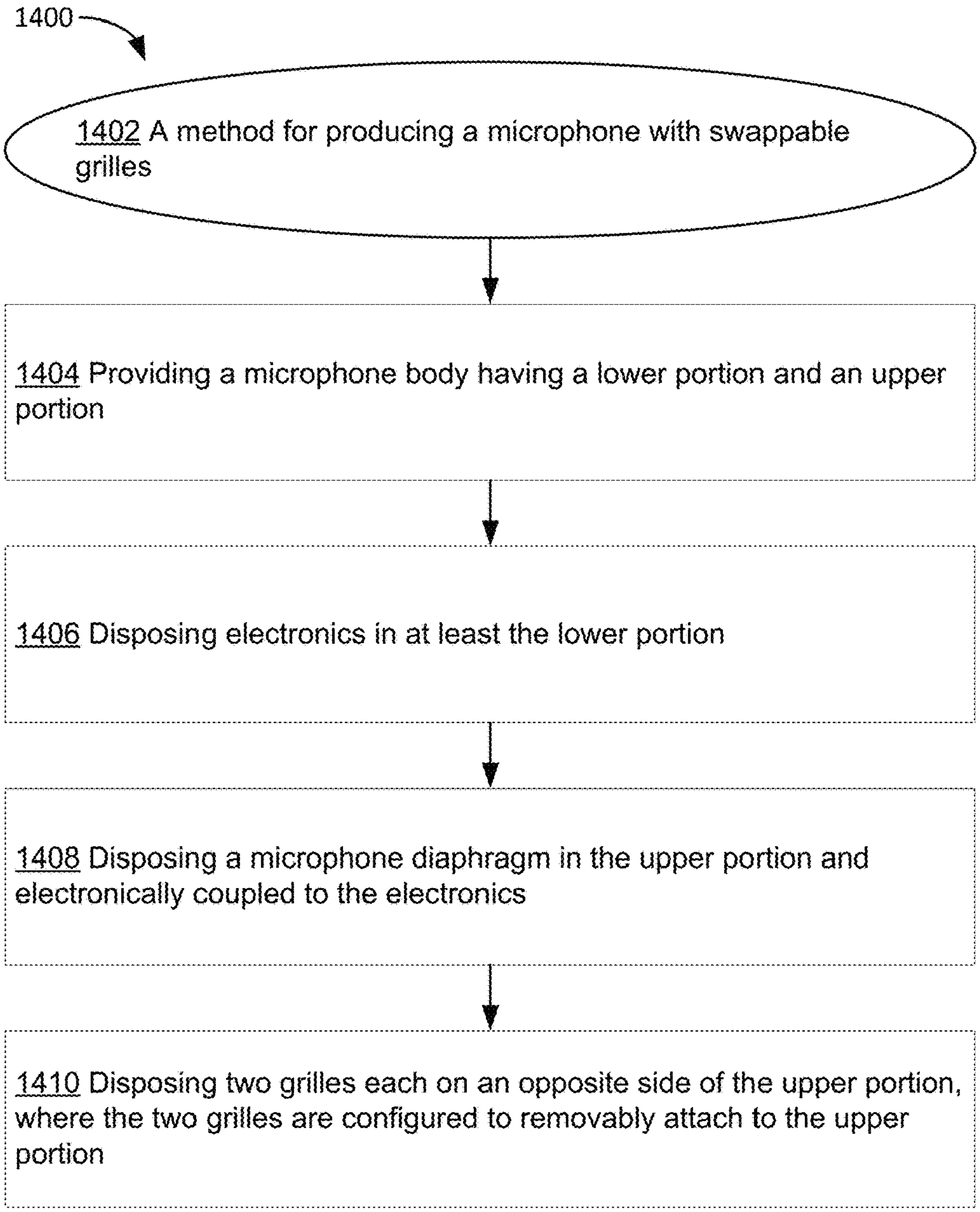
FIG. 14 is a flow diagram showing a method of producing a microphone with swappable grilles, in accordance with some embodiments.

FIG. 14 illustrates a method (1400) of producing (1402) a microphone with swappable grilles (e.g., microphone 100 illustrated in FIG. 1). In some embodiments, a microphone body (e.g., a structural housing, such as microphone body 106 in FIGS. 1 and 2) having a lower portion and an upper portion (e.g., the lower portion and upper portion are integrally formed together, as shown by upper portion 802, 902 of the microphone body 106 in FIGS. 8 and 9, respectively) is provided (1404). In some embodiments, electronics are disposed (1406) in (e.g., coupled to) at least the lower portion (e.g., FIGS. 8 and 9 illustrate associated electronics 803 and 903 (e.g., electronics for enabling audio recording)) in the lower portion 804 of the microphone body 106 and the lower portion of microphone body in FIG. 9, respectively). In some embodiments, a transducer (e.g., a recording device that can receive audio inputs) is disposed (1408) in (e.g., coupled to) the upper portion and electronically coupled to the electronics (e.g., the upper portion includes one or more cutouts). For example, FIG. 9 illustrates that the condenser microphone 900 (e.g., a microphone diaphragm) placed within an upper portion 902 of the microphone body. In some embodiments, the transducer is placed in the lower portion, and the electronics are placed in the upper portion. In some embodiments, the transducer and electronics are both placed in the same portion. In some embodiments, two, optionally substantially planar, grilles are each disposed on (e.g., coupled to and/or removably attached to) an opposite side of the upper portion (e.g., FIG. 2 shows interchangeable-top-front grille 102, interchangeable-bottom-front grille 104, interchangeable-top-rear grille 202, and interchangeable-bottom-rear grille 204). In some embodiments, the grilles are placed on the largest face of the microphone body. In some embodiments, the two grilles are configured to removably attach to the upper portion. For example, the two substantially planar grilles are placed in, and optionally substantially fill, a corresponding one or more cutouts. In some embodiments, the grilles are user hot-swappable (e.g., the one or more swappable integrated audio devices may be swapped while the device is powered and in use). For example, the FIGS. 5-7 illustrate at least three separate coupling methods for removably attaching the grille 500 to the microphone body 106, pictured in FIG. 2.

Figure 15:
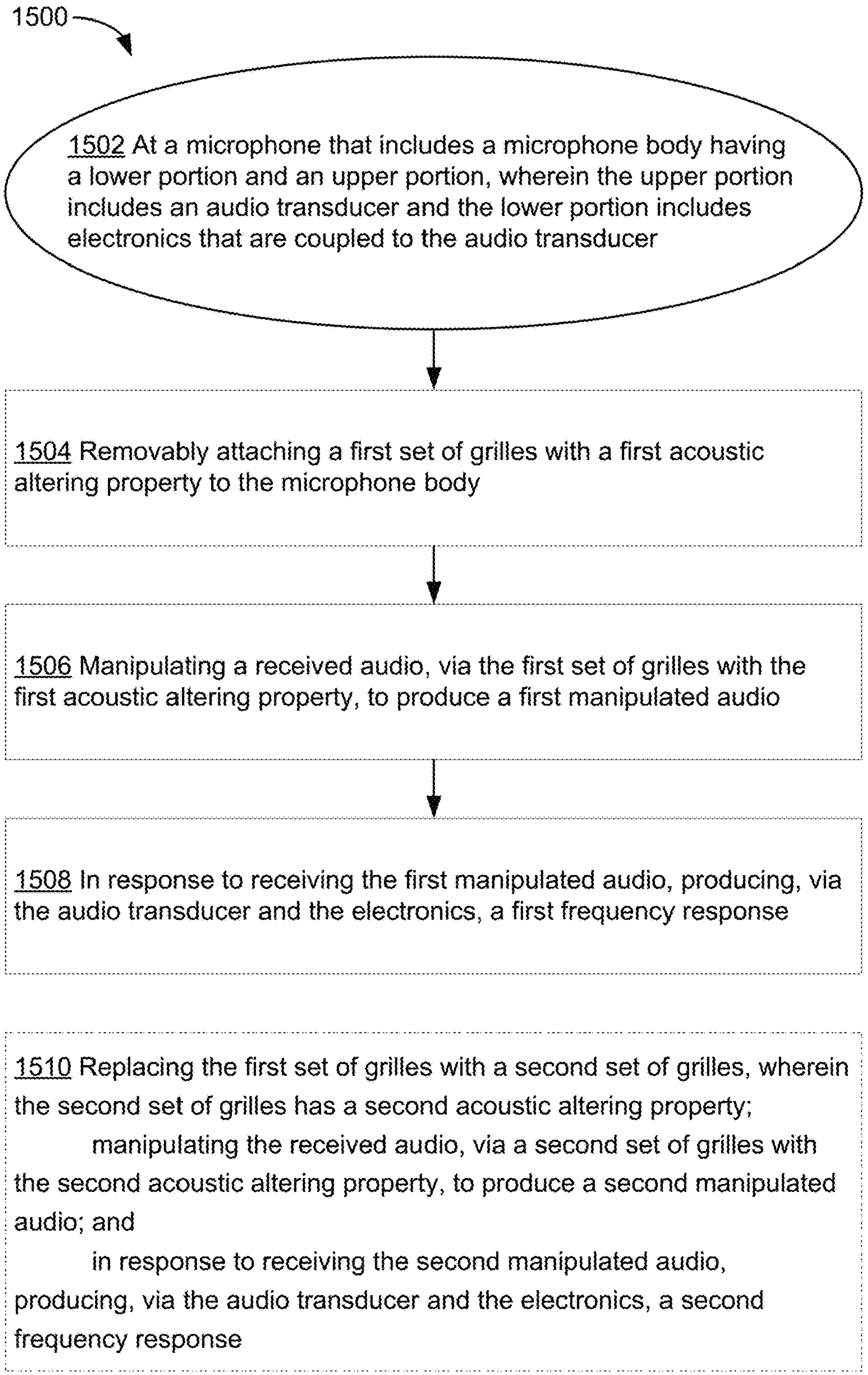
FIG. 15 is a flow diagram showing a method (1500) of switching grilles, in accordance with some embodiments.

FIG. 15 illustrates a method (1500) of switching grilles. In some embodiments, the method occurs at a microphone that includes a microphone body having a lower portion and an upper portion, wherein the upper portion includes an audio transducer and the lower portion includes electronics that are coupled to the audio transducer (1502). In some embodiments, a first set of grilles is removably attached (1504) with a first acoustic altering property to the microphone body. In some embodiments, a received audio is manipulated (1506), via the first set of grilles with the first acoustic altering property, to produce a first manipulated audio. In some embodiments, in response to receiving the first manipulated audio, producing (1508), via the audio transducer and the electronics, a first frequency response.

In some embodiments, the first set of grilles is replaced (1510) with a second set of grilles, wherein the second set of grilles has a second acoustic altering property. In some embodiments, the received audio is manipulated, via a second set of grilles with the second acoustic altering property, to produce a second manipulated audio. In some embodiments, in response to receiving the second manipulated audio, producing, via the audio transducer and the electronics, a second frequency response.

Figure 16:
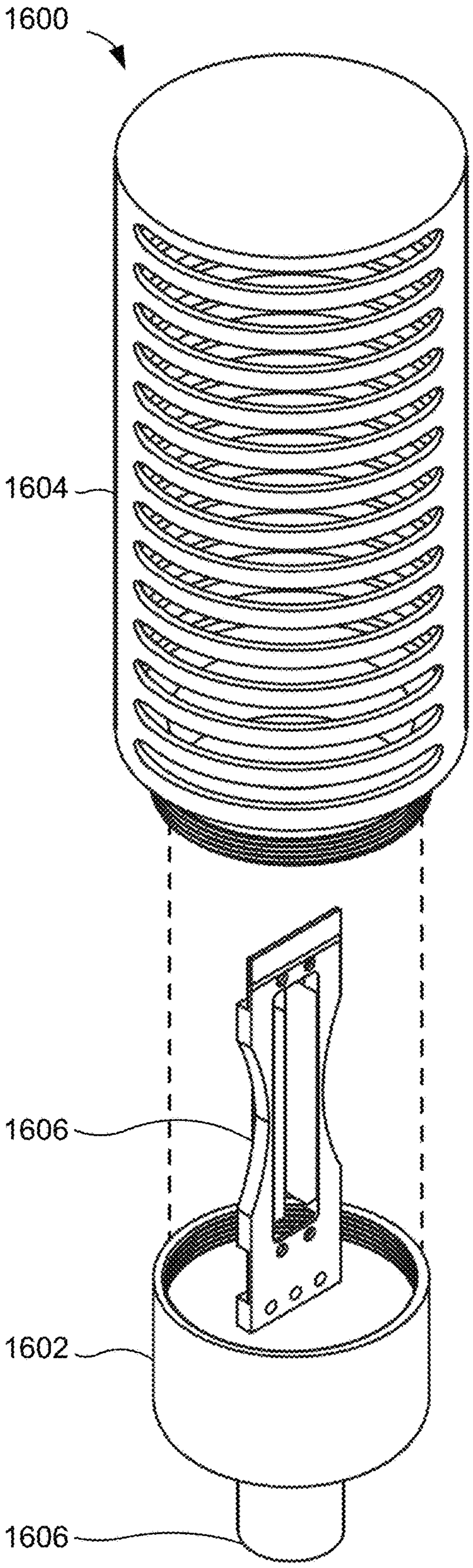
FIG. 16 illustrates a partial exploded perspective view of a mono-ribbon microphone covered by a swappable grille that is attached via threading, in accordance with some embodiments.

FIG. 16 illustrates a partial exploded perspective view of a mono-ribbon microphone covered by a swappable grille that is attached via threading (e.g., akin to a threaded screw), in accordance with some embodiments. FIG. 16 shows a microphone 1600 that has a bottom structure 1602 (also referred to as the lower portion) and an interchangeable top grille 1604 (also referred to us the upper portion). The bottom structure is configured to house one or more electrical components, and is also configured to be attached to a microphone stand via mount 1606.

As discussed in detail above, the interchangeable top grille 1604 can be swapped out with various top grilles with different designs (e.g., cutouts) and/or materials to alter the audio recorded by the microphone(s), e.g., altering the frequency response of a microphone. While a single microphone 1608 is shown in FIG. 16, additional microphones can be included in the structure, e.g., to produce a microphone having a Blumlein type configuration. In some embodiments that have multiple microphones, the microphones are offset from each other at specified angles (e.g., 15 degrees, 30 degrees, 45 degrees, 60 degrees, 75 degrees, 90 degrees, etc.,). In some embodiments, the microphones can be different types of microphones (e.g., ribbon, condenser, capsule, etc.,).

While one interchangeable top grille is shown, it is possible to have a top grille that includes multiple threaded pieces (e.g., stacked cylinders), where each of the multiple threaded pieces can have a different grille designs and/or materials. Thereby allowing the user to speak into different portions of the microphone to produce different desired frequency responses without needing to change the grille. In some embodiments, the multiple threaded pieces can each correspond to different respective microphones.

Having the interchangeable top grille 1604 be threaded allows for a secure connection of the interchangeable top grill 1604 to the bottom structure 1602, which is especially important during live dynamic performances. The threading, however, still allows for quick interchanging of grilles, for example between songs during a live performance.

Figure 17:
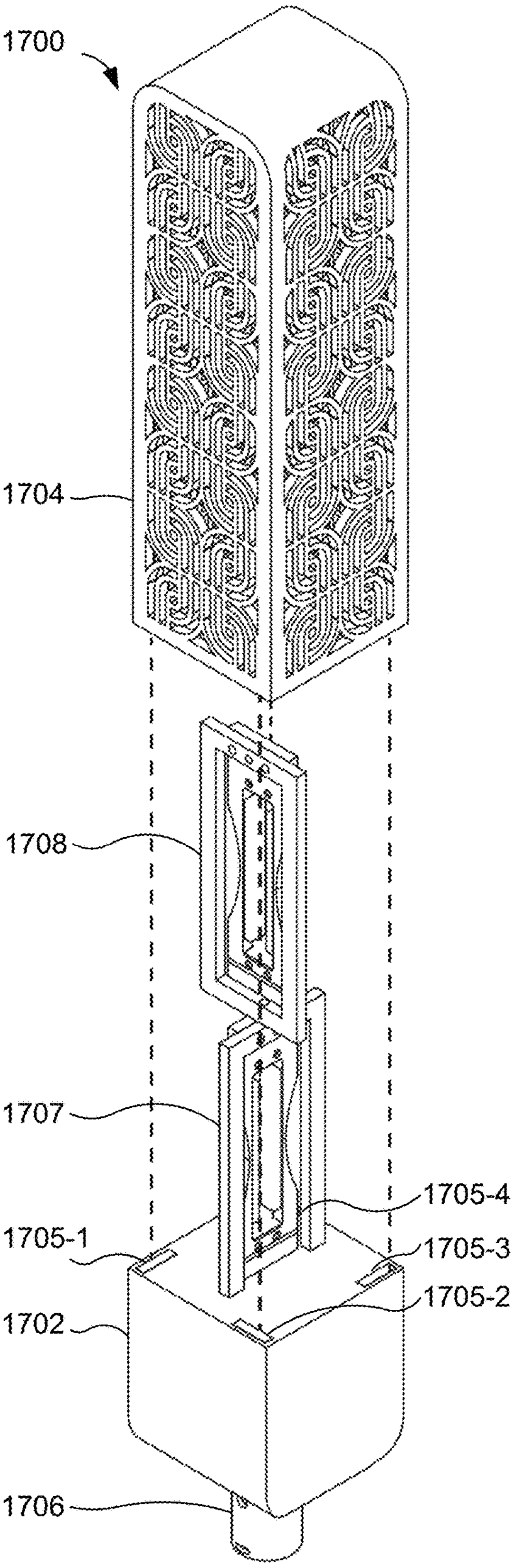
FIG. 17 illustrates a partial exploded perspective view of a stereo microphone covered by a swappable grille that is attached via one or more magnets, in accordance with some embodiments.

FIG. 17 illustrates a partial exploded perspective view of a stereo microphone covered by a swappable grille that is attached via one or more magnets, in accordance with some embodiments. FIG. 17 shows a microphone 1700 that has a bottom structure 1702 (also referred to as the lower portion) and an interchangeable top grille 1704 (also referred to us the upper portion). FIG. 17 also shows multiple magnets 1705-1 through 1705-4 disposed within/on the bottom structure 1602 and corresponding magnets disposed within/on the interchangeable top structure 1704 (not pictured) to secure the interchangeable top grill 1704 to the bottom structure 1702. The bottom structure is also configured to house one or more electrical components, and is also configured to be attached to a microphone stand via mount 1706.

As discussed in detail above, the interchangeable top grille 1704 can be swapped out with various top grilles with different designs (e.g., cutouts, filtering materials, etc.,) and/or materials to alter the audio recorded by the microphone(s), e.g., altering the frequency response of a microphone. As shown, FIG. 17 includes two microphones, microphone 1707 and microphone 1708. Microphone 1707 is oriented 90 degrees from microphone 1708 to produce a Blumlein type microphone. In some embodiments, more than two microphones can be included in the microphone body, and each microphone can have a different orientation. In some embodiments, the microphones are not perpendicular stacked. In some embodiments, the microphones are on the same plane and are opposite of each other. In some embodiments, the microphones are placed around a center point and are able to collect audio from different locations (e.g., to better collect reverberated audio). As previously stated, in some embodiments, the microphones can be different types of microphones (e.g., ribbon, condenser, capsule, etc.,).

While one interchangeable top grille is shown in FIG. 17, it is possible to have a top grille that is composed of multiple magnetically connected pieces (e.g., stacked rectangular extrusions), where each of the multiple threaded pieces can have a different grille designs and/or materials. Thereby allowing audio into different portions of the microphone to produce different desired frequency responses without needing to change the grille(s). In some embodiments, either the integrated top grille 1704 or the bottom structure 1702 are keyed to allow for alignment of the integrated top grille 1704 and the bottom structure 1702.

Having the interchangeable top grille 1704 be magnetically attached allows for a secure connection of the interchangeable top grill 1704 to the bottom structure 1702, but with the ability to quickly interchange grilles, for example when fine tuning in a recording studio.

Figure 18:
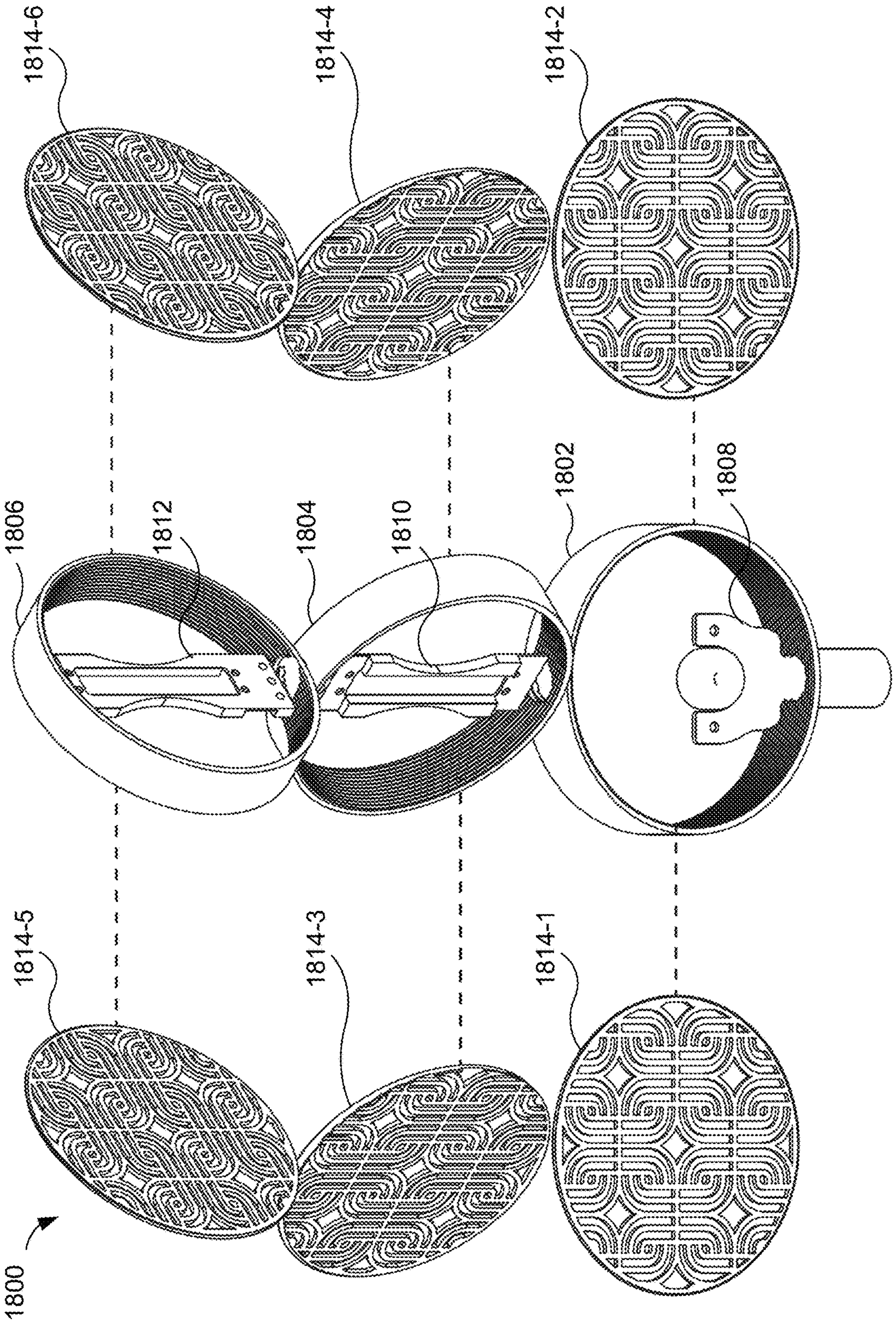
FIG. 18 illustrates a partial exploded perspective view of a stereo microphone covered by multiple swappable grilles that are each attached via threading, in accordance with some embodiments.

FIG. 18 illustrates a partial exploded perspective view of a stereo microphone covered by multiple swappable grilles that are each attached via threading (e.g., akin to a threaded screw), in accordance with some embodiments. FIG. 18 shows a microphone 1800 that includes at least three regions that make up the microphone's body, including, a first region 1802, a second region 1804, and a third region 1806. In this example, each of the regions are extruded cylinders, however, other shapes are possible. This example setup also shows that the first region 1802 includes one or more electronics 1808, and the second region 1804 includes a first microphone 1810, and the third region 1806 includes a second microphone 1812.

The first region 1802, the second region 1804, and the third region 1806 are all threaded and allow for two grilles to be screwed together on either side of the extruded cylinder (e.g., grilles 1814-1 through 1814-6). Each of the grilles can be different designs and/or materials, allowing for fine tuning of the frequency response of the microphone(s). In some embodiments, the second region 1804 and the third region 1806 are offset 90 degrees from each other, which produces a Blumlein type microphone. As discussed above, the microphones orientations can differ in angles and how they are placed relative to each other (e.g., the microphones can be horizontally stacked, vertically stacked, stacked askew, etc.,).

Figure 19:
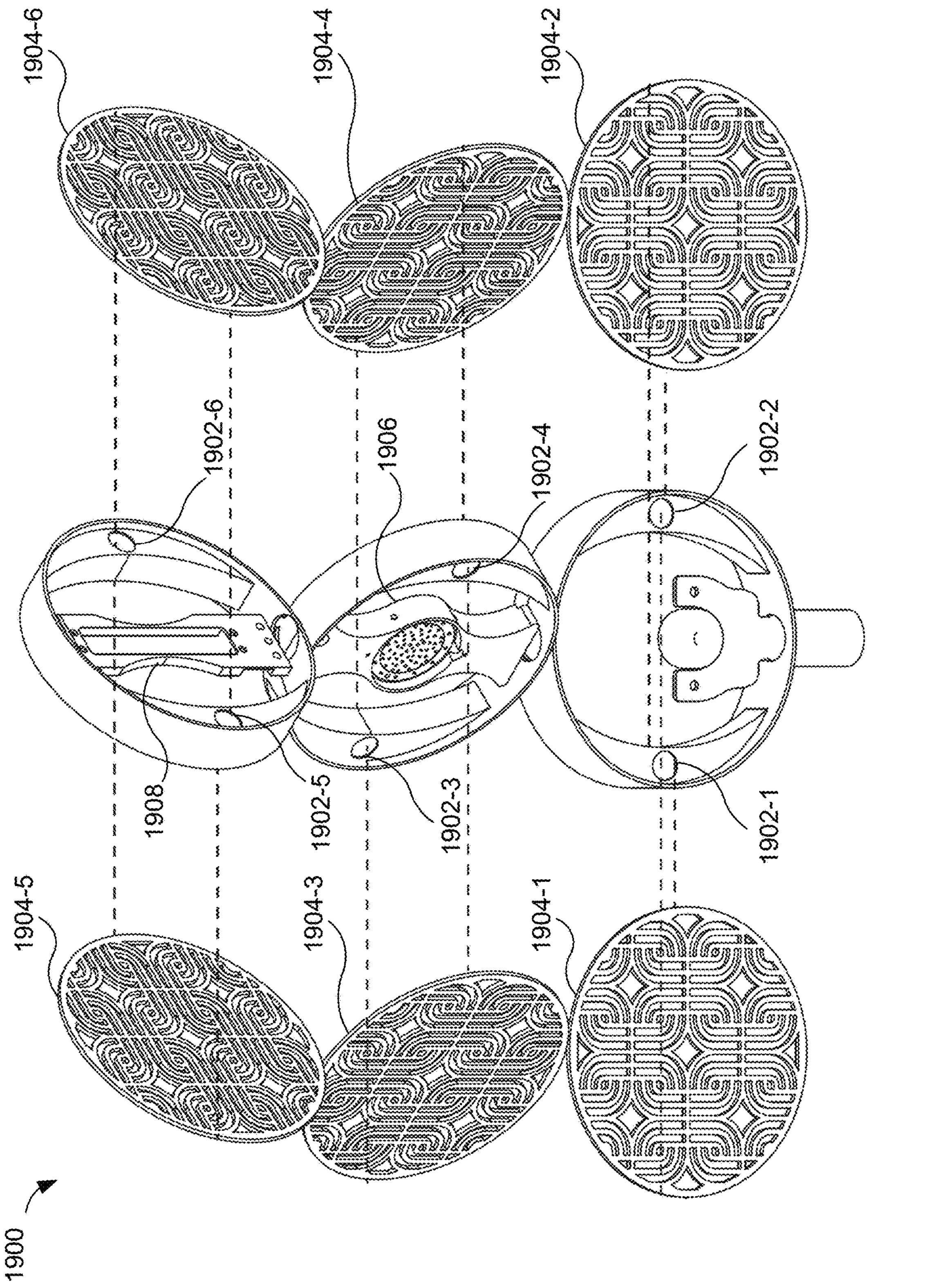
FIG. 19 illustrates a partial exploded perspective view of a hybrid stereo microphone covered by multiple swappable grilles that are each attached via magnets, in accordance with some embodiments.

FIG. 19 illustrates a partial exploded perspective view of a hybrid stereo microphone covered by multiple swappable grilles that are each attached via magnets, in accordance with some embodiments. FIG. 19 shows a microphone 1900, which is a variation of the microphone 1800 shown in FIG. 18. The microphone 1900 shown in FIG. 19 includes magnets 1902-1 through 1902-12 (1902-6 through 1902-12 not pictured) to secure the microphone to the grilles 1904-1 through 1904-4, respectively. In some embodiments, the grilles are made of a ferrous material and connect to the magnets directly, and in other embodiments the grilles are not made of a ferrous material and include magnets to couple the grilles to the microphone body. FIG. 19 also shows that microphone 1906 and microphone 1908 are different types of microphones, and are also oriented 90 degrees offset from each other to produce Blumlein type microphone.

Figure 20:
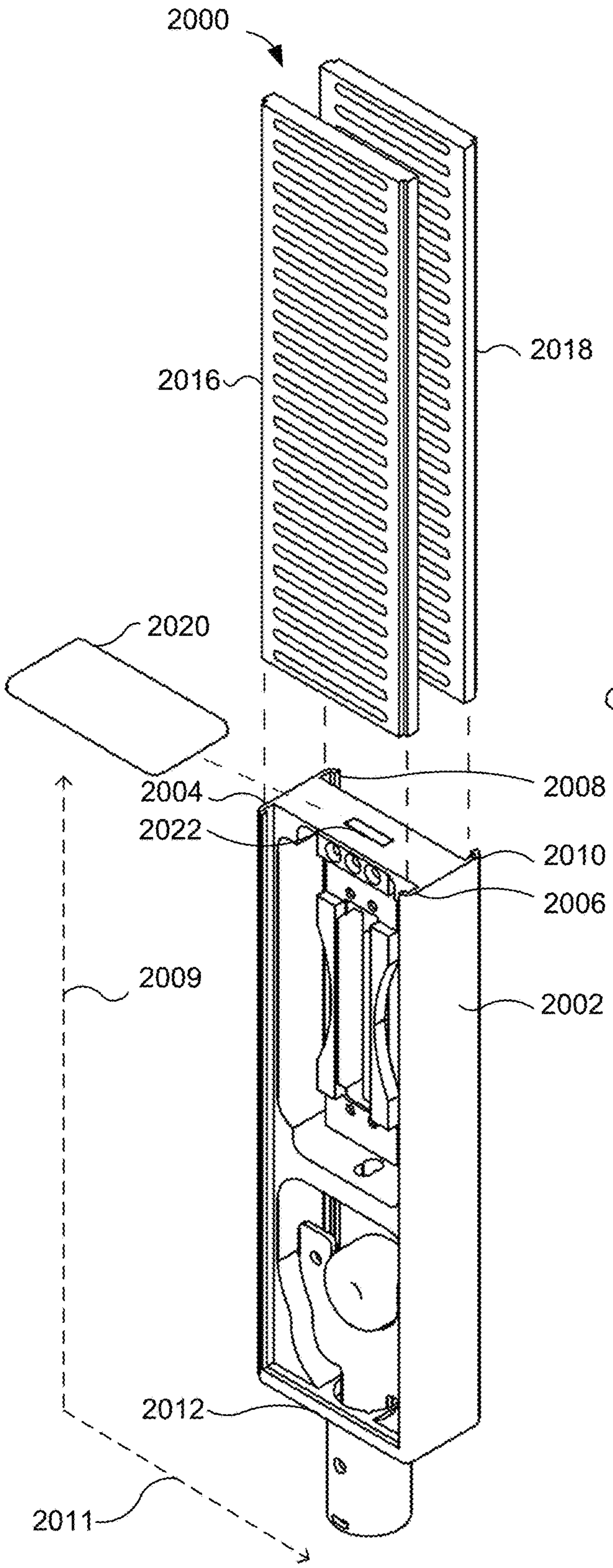
FIG. 20 illustrates a partial exploded perspective view of a microphone with a single piece grille that is secured by sliding the single piece grille into the channels of the microphone body and the single piece grille is further secured by a locking top piece, in accordance with some embodiments.

FIG. 20 illustrates a partial exploded perspective view of a microphone with a single piece grille that is secured by sliding the single piece grille into the channels of the microphone body and the single piece grille is further secured by a locking top piece, in accordance with some embodiments. FIG. 20 shows a microphone 2000 that has a microphone body 2002 that includes four vertical channels (channel 2004, channel 2006, channel 2008, and channel 2010) that are oriented parallel to the major axis 2009 of the microphone body 2002. The microphone body 2002 also includes two lower horizontal stops (lower horizontal stop 2012 and lower horizontal stop 2014 (not pictured)) for providing an end point for removable grille 2016 and removable grill 2018, respectively, to stop the grill from further sliding along the vertical channels. In an alternative embodiment, the microphone 2000 has a microphone body 2002 that includes four horizontal channels that are oriented parallel to a minor axis 2011 of the microphone body 2002. The microphone body 2002 also includes two side vertical stops for providing an end point for the grilles to stop sliding along the vertical channels in a first direction. Stated another way the grilles can be slid into channels from the side of the microphone body instead of from the top of the microphone body.

FIG. 20 also shows a locking top piece 2020 for locking in place the removable grille 2016 and removable grill 2018. In some embodiments, the locking top piece 2020 is made of a magnetic material and secures to magnet 2022 integrated into the microphone body 2002. In other embodiments, the locking top piece 2020 is not made of a ferrous material and includes a magnet embedded into the locking top piece 2020 that mates to magnet 2022.

In some embodiments, the locking top piece 2020 is fixed to the microphone body by a locking rotatable mechanism. In this embodiment, the locking top piece has a shape such that when the locking top piece has a first rotated position, it allows for the removable grille 2016 and removable grill 2018 to be slid out of the microphone body 2002; and when the locking top piece has a second rotated position, different from the first rotated position, that does not allow the removable grille 2016 and removable grill 2018 to be slid out of the microphone body 2002.

In some embodiments, the locking top piece is configured to allow removable grille 2016 and removable grill 2018 to be slid into the channels without impedance, but once the removable grille 2016 and removable grill 2018 are fully slid into the microphone body, the locking top piece automatically locks removable grille 2016 and removable grill 2018 in place and prevents them from being slid out. In this embodiment, the locking top piece is configured to unlock and allow for the removable grille 2016 and removable grill 2018 to be removed upon pressing a release mechanism.

As discussed above, the microphone body of FIG. 20 can also house multiple microphones including different microphone types (e.g., the microphone body can include a condenser microphone, a ribbon microphone, a moving-coil microphone). In some embodiments, a subset of these microphones can be activated based on user selection. For example, a user may determine that a ribbon microphone compliments a certain grille type more than a moving coil microphone.

Figure 21:
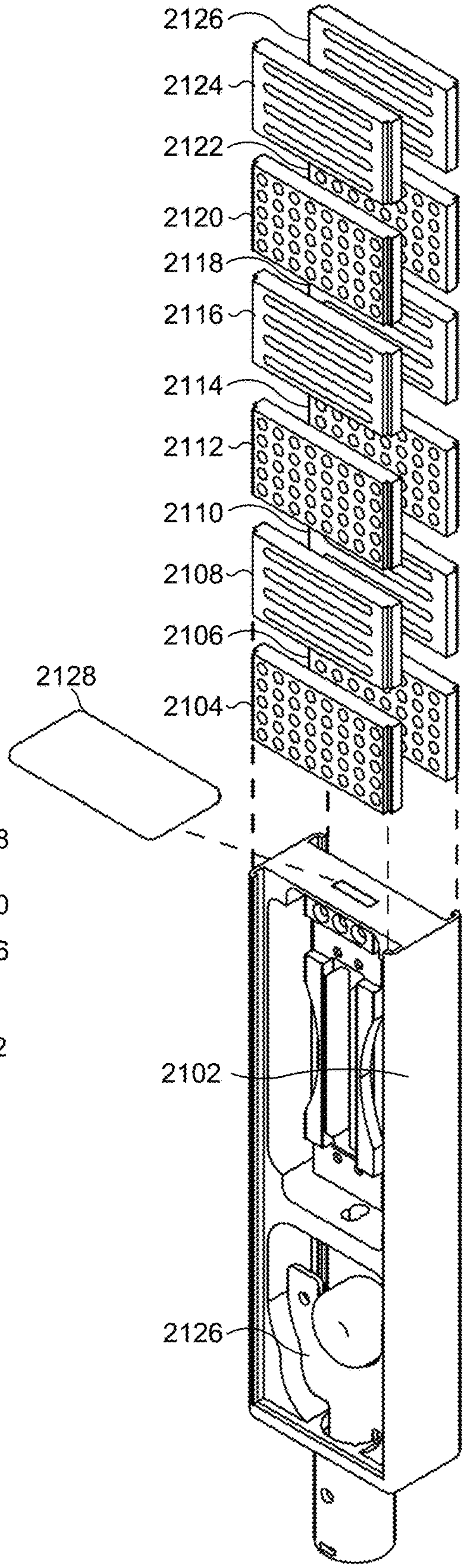
FIG. 21 illustrates a partial exploded perspective view of a microphone with a multi-piece-stackable grille that is secured by sliding the multi-piece-stackable grille into the channels of the microphone body and the multi-piece-stackable grille is further secured by a locking top piece, in accordance with some embodiments.

FIG. 21 illustrates a partial exploded perspective view of a microphone with a multi-piece-stackable grille that is secured by sliding the multi-piece-stackable grille into the channels of the microphone body. The multi-piece-stackable grille is further secured by a locking top piece, in accordance with some embodiments. Similar to the embodiment in FIG. 20, the embodiment in FIG. 21 allows grilles to be slid into a microphone body 2102. FIG. 21, however, illustrates that multiple grilles can be stacked together to produce a multi-piece-stackable grille. As shown in FIG. 21, six grille pieces (grille pieces 2104 through 2112) are placed on a first side of the microphone body 2102 and six additional grille pieces (grille pieces 2104 through 2126) are place on a second side of the microphone body 2102. While twelve grille pieces are shown, any number of grille pieces can be used, including grille pieces of varying sizes. In some embodiments, the number, size, and/or design of the grilles on the first side of the microphone body can be different from the grilles number, size, and/or design of the grilles on the second side of the microphone body. Changing number, size, and/or design of the grilles also allows for fine tuning of the desired frequency response of the microphone(s). In some embodiments, the interaction between the front and back grilles also changes the frequency response of the microphone(s). In some embodiments, this style of microphone can have an unlimited number of grilles as long as they do not exceed the height of the microphone body 2102 when stacked. For example, one embodiment could have four stacked grilles on each side of the microphone body 2102. In another example, one embodiment could have twelve stacked grilles on each side of the microphone body. In yet another example, six stacked grilles can be placed on the first side of the microphone body and four stacked grilles can be placed on the second side of the microphone. In yet another example, six stacked grilles can be placed on the first side of the microphone body and a fixed or single grille can be placed on the second side of the microphone body. In some embodiments, the electronics 2126 are disposed in a separate section where the grille cannot be removed or is not user removable.

As discussed in reference to FIG. 20, the embodiment in FIG. 21 employs the same locking top piece 2128 to keep the grilles secured. In some embodiments, the grilles can be stacked in a manner where each of the stacked grilles corresponds to a different microphone. Thereby allowing the user to speak into different parts of the microphone to produce different frequency responses without having to change grilles during the performance.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A microphone with swappable grilles, the microphone comprising:

- a microphone body having a lower portion and an upper portion;
- electronics disposed in at least the lower portion;
- an audio transducer disposed in the upper portion and electronically coupled to the electronics;
- two grilles each disposed on an opposite side of the upper portion, where the two grilles are configured to removably attach to the upper portion; and
- two more grilles each disposed on an opposite side of the lower portion, where the two more grilles are configured to removably attach to the lower portion.

2. The microphone of claim 1, wherein each of the grilles defines a pattern of holes therethrough.

3. The microphone of claim 2, wherein the pattern of holes is a uniform/non-uniform pattern.

4. The microphone of claim 2, wherein the pattern of grilles is a decorative pattern.

5. The microphone of claim 2, wherein the pattern of grilles is a substantially uniform grid of holes.

6. The microphone of claim 1, wherein the audio transducer includes at least one of a condenser microphone or ribbon microphone.

7. The microphone of claim 1, wherein an audio output is placed at a bottom of the microphone body.

8. The microphone of claim 1, the microphone comprising:

- two additional grilles, wherein the two additional grilles replace the two grilles, further wherein:
  - the two additional grilles, when removably attached to the microphone body, are configured to manipulate incoming sound waves to produce a first manipulated audio to be received by the audio transducer; and
  - the two grilles, when removably attached to the microphone body, are configured to manipulate incoming sound waves to produce a second manipulated audio to be received by the audio transducer.

9. The microphone of claim 8, wherein the electronics are configured to produce a first frequency response corresponding to the first manipulated audio, and the electronics are configured to produce a second frequency response corresponding to the second manipulated audio, further wherein the first frequency response is not the same as the second frequency response.

10. The microphone of claim 1, wherein the two more grilles are different in size from the two grilles.

11. The microphone of claim 1, wherein each removably attachable microphone grille includes a fabric structure encompassing substantially all of each grille.

12. The microphone of claim 1, wherein the two grilles are affixed to the microphone body using either magnet coupling, screw coupling, press-fit coupling, hook and loop coupling, adhesive coupling, latch coupling, and screwing the two grilles into the microphone body.

13. The microphone of claim 1, wherein at least one of the two grilles include a mounting bracket, further wherein a patterned grille plate is affixed to the mounting bracket and the mounting bracket is configured to be affixed to the microphone body.

14. The microphone of claim 1, wherein the microphone body is a single rigid piece of material.

15. The microphone of claim 1, wherein the grilles each include a tab for removing each grille from the microphone body.

16. The microphone of claim 15, wherein removing each grille from the microphone body requires a pulling force on the tab in a substantially linear direction.

17. The microphone of claim 1, wherein the two grilles are substantially planar.

18. A method for producing a microphone with swappable grilles, the method comprising:

providing a microphone body having a lower portion and an upper portion;

disposing electronics in at least the lower portion;

disposing an audio transducer in the upper portion and electronically coupled to the electronics;

removably attaching two grilles each on an opposite side of the upper portion; and removably attaching two more grilles each disposed on an opposite side of the lower portion.

19. A method of switching grilles, the method including:

at a microphone that includes a microphone body having a lower portion and an upper portion, wherein the upper portion includes an audio transducer and the lower portion includes electronics that are coupled to the audio transducer:

removably attaching a first set of grilles, wherein at least two grilles of the first set are disposed on an opposite side of the upper portion, and the first set of grilles provides with a first acoustic altering property to the microphone body;

manipulating a received audio, via the first set of grilles with the first acoustic altering property, to produce a first manipulated audio; and in response to receiving the first manipulated audio, producing, via the audio transducer and the electronics, a first frequency response; and removably attaching a second set of grilles, wherein at least two grilles of the second set are disposed on an opposite side of the lower portion.

20. The method of claim 19, wherein the second set of grilles has a second acoustic altering property, and the method further includes:

manipulating the received audio, via the second set of grilles with the second acoustic altering property, to produce a second manipulated audio; and in response to receiving the second manipulated audio, producing, via the audio transducer and the electronics, a second frequency response.

21. The microphone of claim 1, wherein the two more grilles include one or more holes therethrough.

22. The method of claim 18, wherein the two more grilles include one or more holes therethrough.

23. The method of claim 19, wherein the at least two grilles of the second set include one or more holes therethrough.

* * * * *